(12) United States Patent
Dai et al.

(10) Patent No.: US 12,216,250 B2
(45) Date of Patent: Feb. 4, 2025

(54) OPTICAL IMAGING LENS ASSEMBLY

(71) Applicant: Zhejiang Sunny Optics Co., Ltd, Yuyao (CN)

(72) Inventors: Fujian Dai, Yuyao (CN); Wuchao Xu, Yuyao (CN); Liefeng Zhao, Yuyao (CN)

(73) Assignee: Zhejiang Sunny Optics Co., Ltd (CN)

(*) Notice: Subject to any disclaimer, the term of this patent is extended or adjusted under 35 U.S.C. 154(b) by 518 days.

(21) Appl. No.: 17/529,880

(22) Filed: Nov. 18, 2021

(65) Prior Publication Data

US 2022/0196983 A1 Jun. 23, 2022

(30) Foreign Application Priority Data

Dec. 21, 2020 (CN) .......................... 202011519323.3

(51) Int. Cl.
*G02B 13/00* (2006.01)
*G02B 9/64* (2006.01)
(52) U.S. Cl.
CPC .......... *G02B 13/0045* (2013.01); *G02B 9/64* (2013.01)
(58) Field of Classification Search
CPC ........................... G02B 13/0045; G02B 9/64
USPC ........................................................ 359/708
See application file for complete search history.

(56) References Cited

U.S. PATENT DOCUMENTS

| 2016/0170180 A1* | 6/2016 | Son ...................... G02B 13/0045 359/708 |
| 2019/0154974 A1* | 5/2019 | Chen ......................... G02B 9/64 |
| 2020/0003995 A1* | 1/2020 | Jung ......................... G02B 9/64 |
| 2020/0241244 A1* | 7/2020 | Chen ......................... G02B 9/64 |

FOREIGN PATENT DOCUMENTS

| CN | 108957692 A | 12/2018 |
| CN | 110174743 A | 8/2019 |
| CN | 110927933 A | 3/2020 |
| CN | 111308671 A | 6/2020 |
| CN | 213690089 U | 7/2021 |

OTHER PUBLICATIONS

First Office Action for Chinese Application No. 202011519323.3, dated Dec. 6, 2024, 7 pages.

\* cited by examiner

*Primary Examiner* — Sharrief I Broome
(74) *Attorney, Agent, or Firm* — Barnes & Thornburg LLP

(57) ABSTRACT

An optical imaging lens assembly, along an optical axis from an object side to an image side, sequentially includes: first to seventh lenses. The first lens has refractive power; the third lens has a concave object-side surface and a convex image-side surface; the fourth lens has negative refractive power, an object-side surface of the fourth lens is a concave surface, and an image-side surface of the fourth lens is a concave surface; the fifth lens has refractive power. The optical imaging lens assembly satisfies: TTL/ImgH≤1.5; and FOV>100°, where, TTL is a distance from an object-side surface of the first lens to an imaging plane of the optical imaging lens assembly on the optical axis, ImgH is half of a diagonal length of an effective pixel area on the imaging plane, and FOV is a maximum field-of-view of the optical imaging lens assembly.

20 Claims, 9 Drawing Sheets

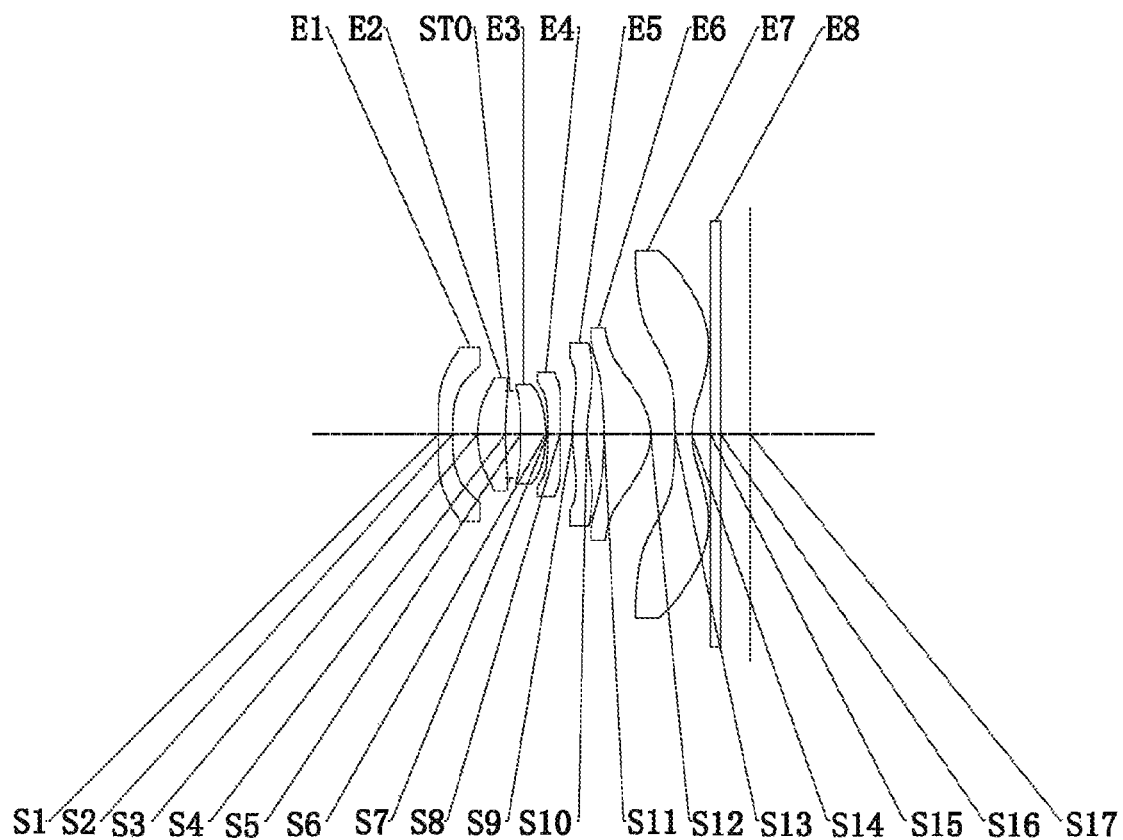
Fig. 1
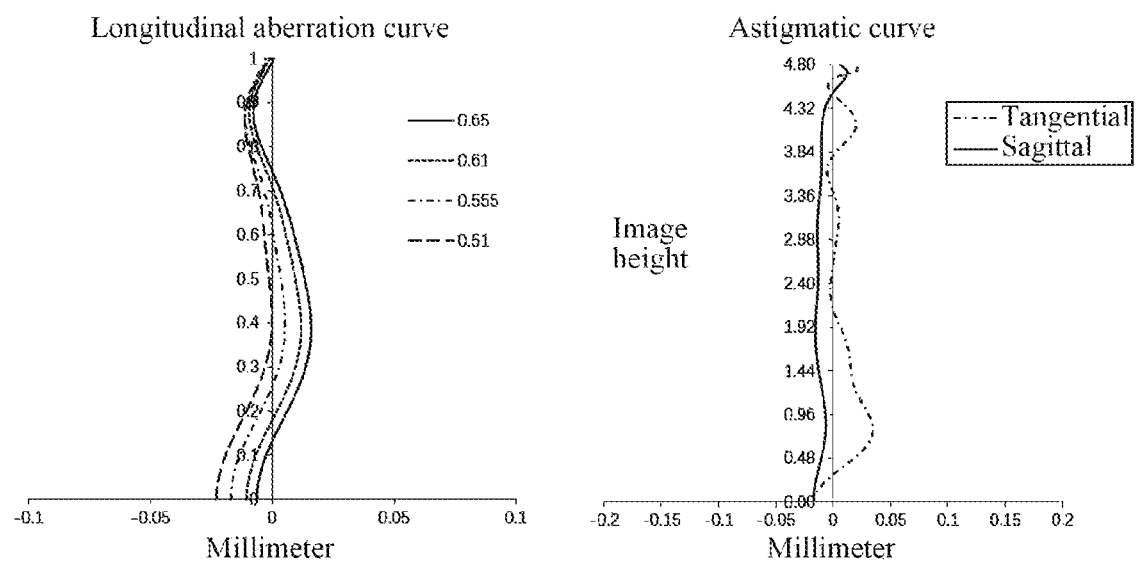
Fig. 2A
Fig. 2B

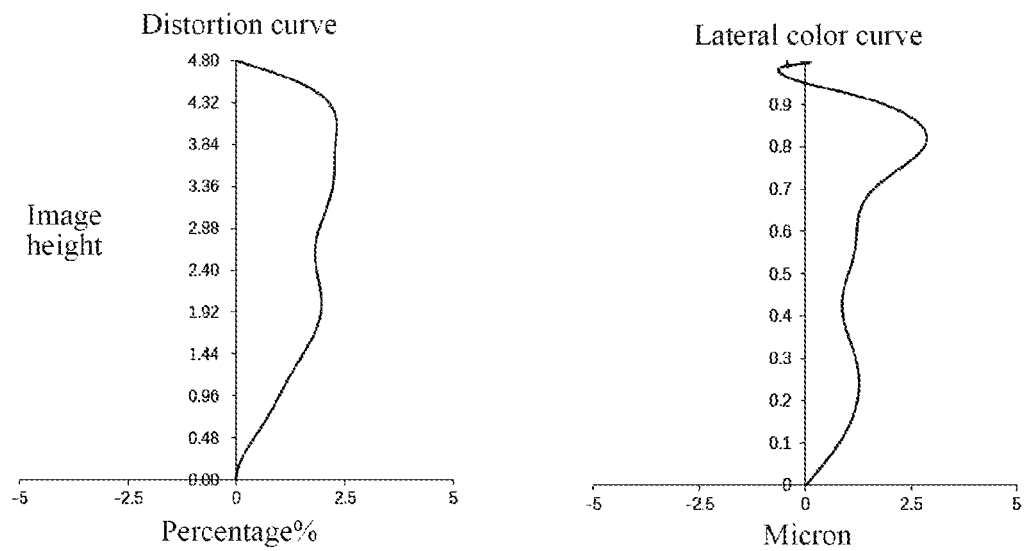
Fig. 6C
Fig. 6D
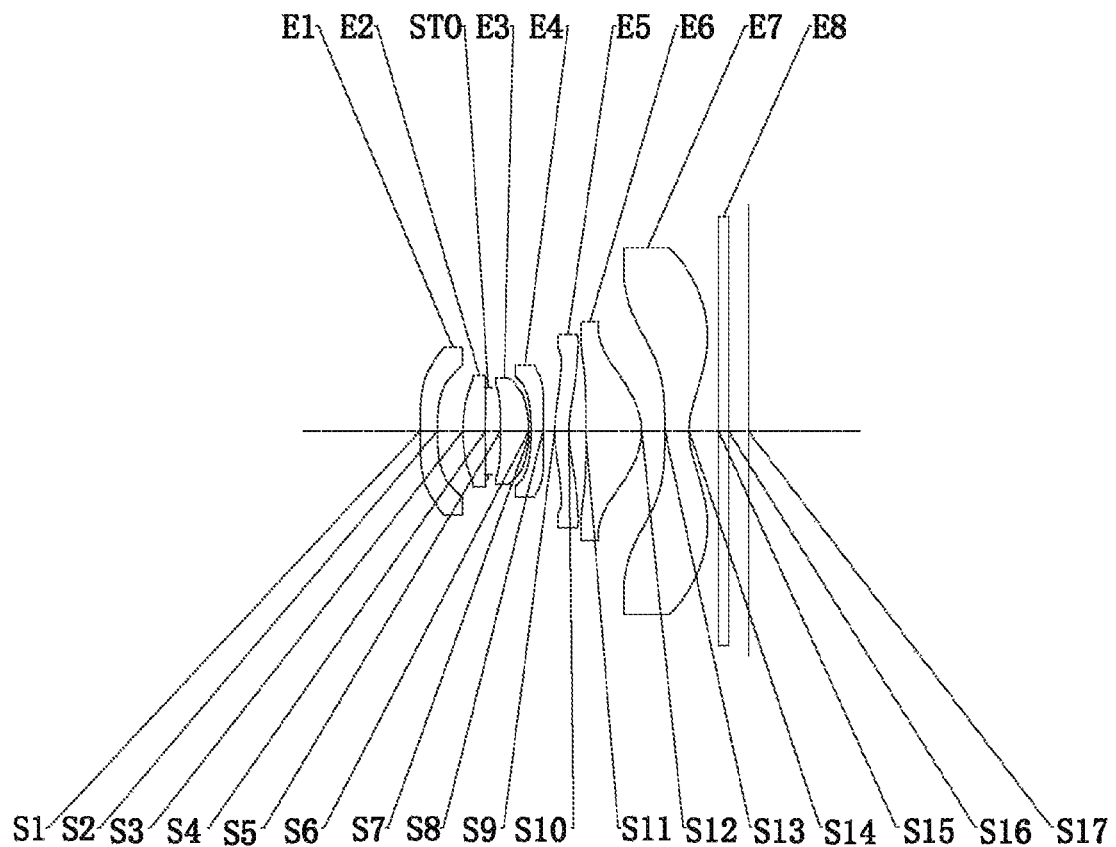
Fig. 7

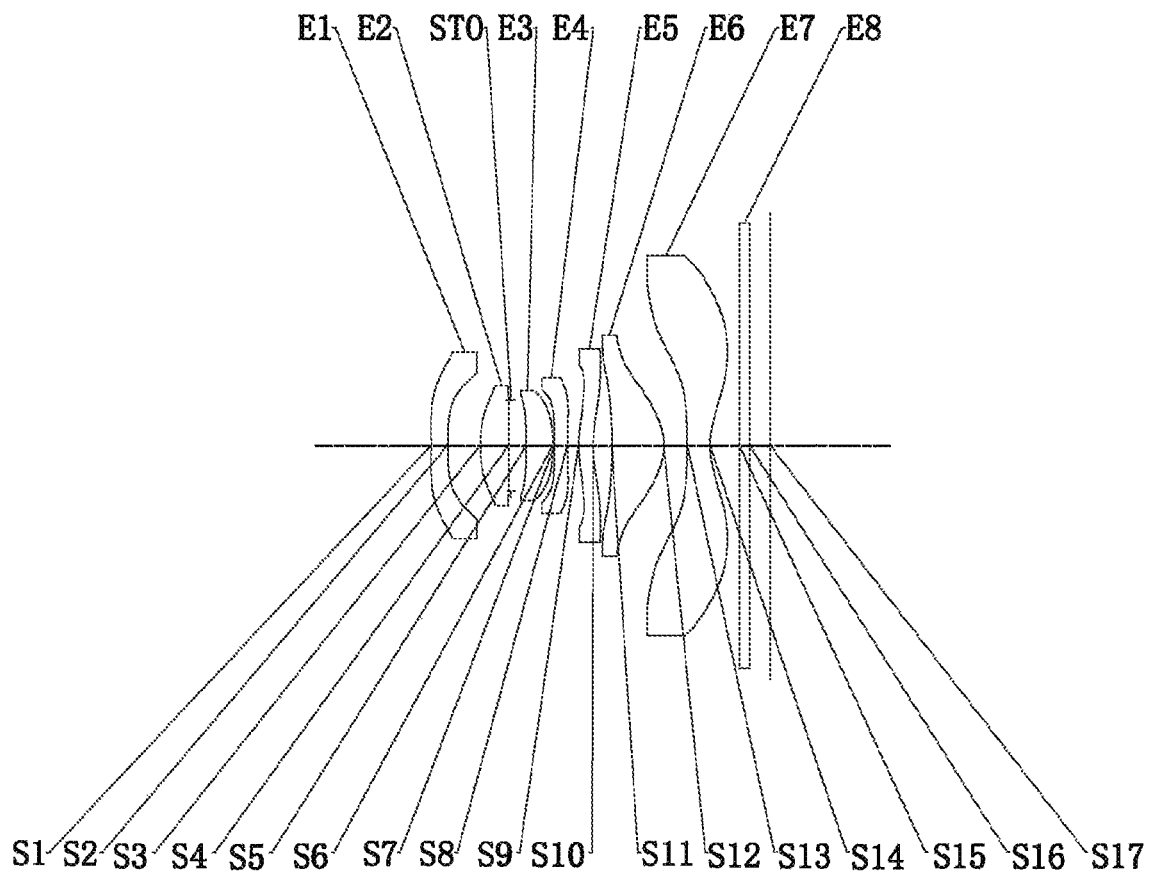
Fig. 9
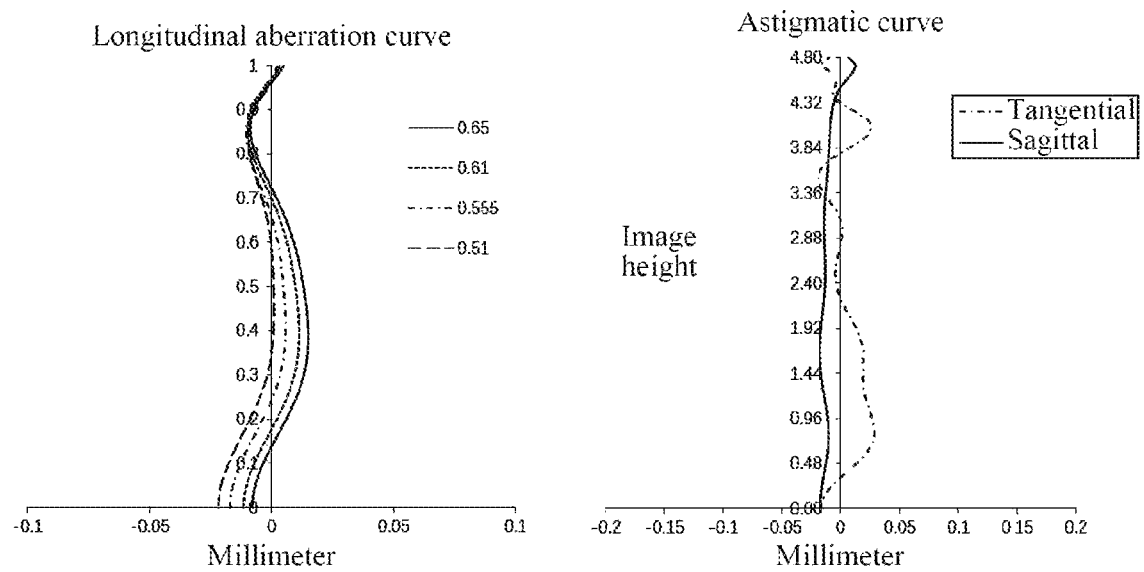
Fig. 10AFig. 10B

OPTICAL IMAGING LENS ASSEMBLY

CROSS-REFERENCE TO RELATED APPLICATIONS

This application claims benefit of priority to Chinese Patent Application No. 202011519323.3 filed on Dec. 21, 2020 before the China National Intellectual Property Administration, the entire disclosure of which is incorporated herein by reference in its entity.

TECHNICAL FIELD

The present disclosure relates to an optical imaging lens assembly, and more particularly, to an optical imaging lens assembly including seven lenses.

BACKGROUND

With the rapid development of electronic products, the application of camera lens assemblies suitable for electronic products is becoming more and more extensive. In addition, as the electronic products are gradually becoming thinner and lighter, the camera lens assemblies suitable for electronic products need to have a thin and light shape while meeting good image quality, so as to effectively reduce the product cost and make the electronic products have a more user-friendly design.

Typically, the photosensitive device of a camera lens assembly is nothing more than a photosensitive charge-coupled device (CCD) or a complementary metal-oxide semiconductor (CMOS). Due to the advancement of semiconductor manufacturing technology, the pixel size of photosensitive devices continues to reduce. In addition, with the development trend of today's electronic products having good functions, thin, light and short shape, a miniaturized camera lens assembly having good imaging quality is therefore the current focus of research and development.

In order to meet the requirements of high pixels and large field-of-view, the prior art often adopts a large-diameter configuration, which results in a relatively long lens assembly size. It is known that it is difficult for the existing optical lens assembly to meet the requirements of large aperture and short total length at the same time, especially the peripheral image is more sensitive to the aperture size. In addition, in order to further increase the field-of-view, it often leads to increased distortion and excessively large main ray exit angle, resulting in insufficient resolution of the lens assembly.

SUMMARY

In one aspect, embodiments of the present disclosure provide an optical imaging lens assembly. The optical imaging lens assembly, along an optical axis from an object side to an image side, may sequentially include: a first lens having refractive power; a second lens; a third lens, an object-side surface of the third lens being a concave surface, and an image-side surface of the third lens being a convex surface; a fourth lens having negative refractive power, an object-side surface of the fourth lens being a concave surface, and an image-side surface of the fourth lens being a concave surface; a fifth lens having refractive power; a sixth lens; and a seventh lens. The optical imaging lens assembly may satisfy: TTL/ImgH≤1.5; and FOV>100°, where, TTL is a distance from an object-side surface of the first lens to an imaging plane of the optical imaging lens assembly on the optical axis, ImgH is half of a diagonal length of an effective pixel area on the imaging plane, and FOV is a maximum field-of-view of the optical imaging lens assembly.

In some embodiments, the optical imaging lens assembly may satisfy: 0<(R9+R10)/f<2.0, where, R9 is a radius of curvature of an object-side surface of the fifth lens, R10 is a radius of curvature of an image-side surface of the fifth lens, and f is an effective focal length of the optical imaging lens assembly.

In some embodiments, the optical imaging lens assembly may satisfy: 0.5<R10/f<1.0, where, R10 is a radius of curvature of an image-side surface of the fifth lens, and f is an effective focal length of the optical imaging lens assembly.

In some embodiments, the optical imaging lens assembly may satisfy: 3.5<|f4×tan(FOV/2)|/R9<5.5, where, f4 is an effective focal length of the fourth lens, FOV is the maximum field-of-view of the optical imaging lens assembly, and R9 is a radius of curvature of an object-side surface of the fifth lens.

In some embodiments, the optical imaging lens assembly may satisfy: 2.0≤f12/f≤3.2, where, f12 is a combined focal length of the first lens and the second lens, and f is an effective focal length of the optical imaging lens assembly.

In some embodiments, the optical imaging lens assembly may satisfy: 2.0≤(CT4+CT5)/T45≤4.5, where, CT4 is a center thickness of the fourth lens along the optical axis, CT5 is a center thickness of the fifth lens along the optical axis, and T45 is a spacing distance between the fourth lens and the fifth lens along the optical axis.

In some embodiments, the optical imaging lens assembly may satisfy: 3.4≤SAG62/SAG61≤9.8, where, SAG61 is an axial distance from an intersection of an object-side surface of the sixth lens and the optical axis to a vertex of an effective radius of the object-side surface of the sixth lens, and SAG62 is an axial distance from an intersection of an image-side surface of the sixth lens and the optical axis to a vertex of an effective radius of the image-side surface of the sixth lens.

In some embodiments, the optical imaging lens assembly may satisfy: 3.0≤f2/f123+f3/f123≤4.5, where, f2 is an effective focal length of the second lens, f3 is an effective focal length of the third lens, and f123 is a combined focal length of the first lens, the second lens, and the third lens.

In some embodiments, the optical imaging lens assembly may satisfy: 0.5≤f2/f3≤1.5, where, f2 is an effective focal length of the second lens, and f3 is an effective focal length of the third lens.

In some embodiments, the optical imaging lens assembly may satisfy: 1.0≤(CT1+CT2+CT3+CT4+CT5)/(CT6+CT7)≤1.5, where, CT1 is a center thickness of the first lens along the optical axis, CT2 is a center thickness of the second lens along the optical axis, CT3 is a center thickness of the third lens along the optical axis, CT4 is a center thickness of the fourth lens along the optical axis, CT5 is a center thickness of the fifth lens along the optical axis, CT6 is a center thickness of the sixth lens along the optical axis, and CT7 is a center thickness of the seventh lens along the optical axis.

In some embodiments, the optical imaging lens assembly may satisfy: −4.0≤(R5+R6)/f3≤−1.0, where, R5 is a radius of curvature of the object-side surface of the third lens, R6 is a radius of curvature of the image-side surface of the third lens, and f3 is an effective focal length of the third lens.

In some embodiments, the optical imaging lens assembly may satisfy: 1.5≤ΣCT/ΣAT≤2.3, where, ΣAT is a sum of spacing distances of any two adjacent lenses from the first lens to the seventh lens along the optical axis, and $\Sigma CT$ is a sum of center distances of the first lens to the seventh lens respectively along the optical axis.

In another aspect, the present disclosure provides an optical imaging lens assembly. The optical imaging lens assembly, along an optical axis from an object side to an image side, may sequentially include: a first lens having refractive power; a second lens; a third lens, an object-side surface of the third lens being a concave surface, and an image-side surface of the third lens being a convex surface; a fourth lens; a fifth lens having refractive power; a sixth lens; and a seventh lens. The optical imaging lens assembly satisfies: TTL/ImgH≤1.5; FOV>100°; and 0<(R9+R10)/f<2.0, where, TTL is a distance from an object-side surface of the first lens to an imaging plane of the optical imaging lens assembly on the optical axis, ImgH is half of a diagonal length of an effective pixel area on the imaging plane, FOV is a maximum field-of-view of the optical imaging lens assembly, R9 is a radius of curvature of an object-side surface of the fifth lens, R10 is a radius of curvature of an image-side surface of the fifth lens, and f is an effective focal length of the optical imaging lens assembly.

In some embodiments, the optical imaging lens assembly may satisfy: 0.5<R10/f<1.0, where, R10 is the radius of curvature of the image-side surface of the fifth lens, and f is the effective focal length of the optical imaging lens assembly.

In some embodiments, the optical imaging lens assembly may satisfy: 3.5<|f4×tan(FOV/2)|/R9<5.5, where, f4 is an effective focal length of the fourth lens, FOV is the maximum field-of-view of the optical imaging lens assembly, and R9 is the radius of curvature of the object-side surface of the fifth lens.

In some embodiments, the optical imaging lens assembly may satisfy: 2.0≤f12/f≤3.2, where, f12 is a combined focal length of the first lens and the second lens, and f is the effective focal length of the optical imaging lens assembly.

In some embodiments, the optical imaging lens assembly may satisfy: 2.0≤(CT4+CT5)/T45≤4.5, where, CT4 is a center thickness of the fourth lens along the optical axis, CT5 is a center thickness of the fifth lens along the optical axis, and T45 is a spacing distance between the fourth lens and the fifth lens along the optical axis.

In some embodiments, the optical imaging lens assembly may satisfy: 3.4≤SAG62/SAG61≤9.8, where, SAG61 is an axial distance from an intersection of an object-side surface of the sixth lens and the optical axis to a vertex of an effective radius of the object-side surface of the sixth lens, and SAG62 is an axial distance from an intersection of an image-side surface of the sixth lens and the optical axis to a vertex of an effective radius of the image-side surface of the sixth lens.

In some embodiments, the optical imaging lens assembly may satisfy: 3.0≤f2/f123+f3/f123≤4.5, where, f2 is an effective focal length of the second lens, f3 is an effective focal length of the third lens, and f123 is a combined focal length of the first lens, the second lens, and the third lens.

In some embodiments, the optical imaging lens assembly may satisfy: 0.5≤f2/f3≤1.5, where, f2 is an effective focal length of the second lens, and f3 is an effective focal length of the third lens.

In some embodiments, the optical imaging lens assembly may satisfy: 1.0≤(CT1+CT2+CT3+CT4+CT5)/(CT6+CT7)≤1.5, where, CT1 is a center thickness of the first lens along the optical axis, CT2 is a center thickness of the second lens along the optical axis, CT3 is a center thickness of the third lens along the optical axis, CT4 is a center thickness of the fourth lens along the optical axis, CT5 is a center thickness of the fifth lens along the optical axis, CT6 is a center thickness of the sixth lens along the optical axis, and CT7 is a center thickness of the seventh lens along the optical axis.

In some embodiments, the optical imaging lens assembly may satisfy: −4.0≤(R5+R6)/f3≤−1.0, where, R5 is a radius of curvature of the object-side surface of the third lens, R6 is a radius of curvature of the image-side surface of the third lens, and f3 is an effective focal length of the third lens.

In some embodiments, the optical imaging lens assembly may satisfy: 1.5≤$\Sigma$CT/$\Sigma$AT≤2.3, where, $\Sigma$AT is a sum of spacing distances of any two adjacent lenses from the first lens to the seventh lens along the optical axis, and $\Sigma$CT is a sum of center distances of the first lens to the seventh lens respectively along the optical axis.

BRIEF DESCRIPTION OF THE DRAWINGS

By reading detailed description of non-limiting embodiments with reference to the following accompanying drawings, other features, objectives and advantages of the present disclosure will be more apparent. In the accompanying drawings:

FIG. 1 is a schematic structural diagram illustrating an optical imaging lens assembly according to Embodiment 1 of the present disclosure;

FIGS. 2A-2D respectively illustrate a longitudinal aberration curve, an astigmatic curve, a distortion curve and a lateral color curve of the optical imaging lens assembly according to Embodiment 1;

FIGS. 6A-6D respectively illustrate a longitudinal aberration curve, an astigmatic curve, a distortion curve and a lateral color curve of the optical imaging lens assembly according to Embodiment 3;

FIG. 7 is a schematic structural diagram illustrating an optical imaging lens assembly according to Embodiment 4 of the present disclosure;

FIG. 9 is a schematic structural diagram illustrating an optical imaging lens assembly according to Embodiment 5 of the present disclosure;

FIGS. 10A-10D respectively illustrate a longitudinal aberration curve, an astigmatic curve, a distortion curve and a lateral color curve of the optical imaging lens assembly according to Embodiment 5;

DETAILED DESCRIPTION OF EMBODIMENTS

Figures 2C, 2D:
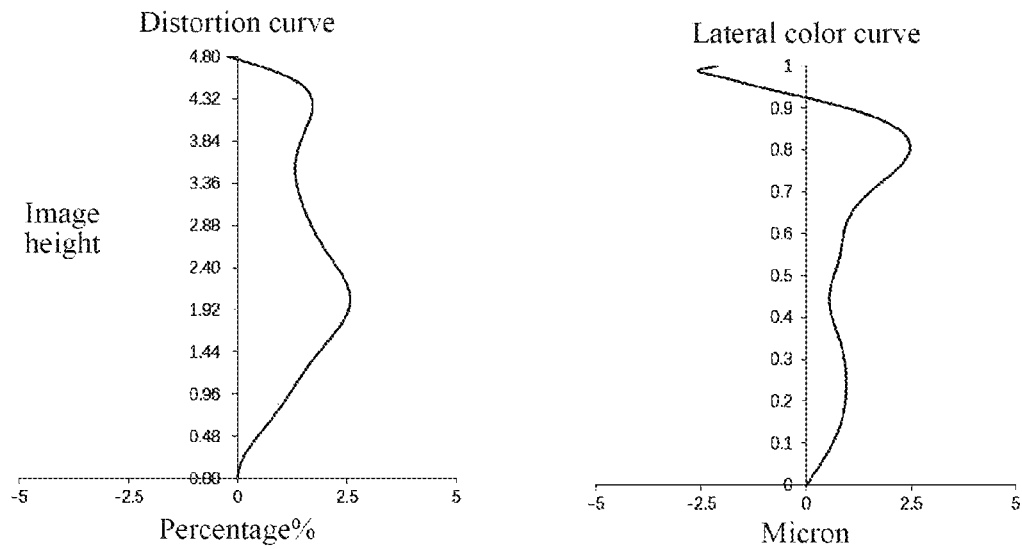

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by Embodiments. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the surface of a lens is a convex surface and the position of the convex surface is not defined, it indicates that the surface of the lens is a convex surface at least in the paraxial area; and if the surface of a lens is a concave surface and the position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having", "containing" and/or "contain," when used in the specification, specify the presence of stated features, elements and/or components, but do not exclude the presence or addition of one or more other features, elements, components and/or combinations thereof. In addition, expressions, such as "at least one of . . . ," when appearing preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

The features, principles, and other aspects of the present disclosure are described in detail below.

The optical imaging lens assembly according to exemplary implementations of the present disclosure includes, for example, seven lenses having refractive power, for example, a first lens, a second lens, a third lens, a fourth lens, a fifth lens, a sixth lens and a seventh lens. The first lens to the seventh lens may be arranged in sequence from an object side to an image side along an optical axis. Any two adjacent lenses in the first lens to the seventh lens may have an air spacing in between.

In an exemplary implementation, the first lens has positive refractive power or negative refractive power. At least one of an object-side surface and an image-side surface of the first lens may be a concave surface.

In an exemplary implementation, the second lens may have positive refractive power. At least one of an object-side surface and an image-side surface of the second lens may be a convex surface. Alternatively, the object-side surface of the second lens may be a convex surface.

In an exemplary implementation, the third lens may have positive refractive power, an object-side surface of the third lens may be a concave surface, and an image-side surface of the third lens may be a convex surface.

In an exemplary implementation, the fourth lens may have negative refractive power, an object-side surface of the fourth lens may be a concave surface, and an image-side surface of the fourth lens may be a concave surface.

In an exemplary implementation, the fifth lens has positive refractive power or negative refractive power. An object-side surface of the fifth lens may be a convex surface, and an image-side surface of the fifth lens may be a concave surface.

In an exemplary implementation, the sixth lens may have positive refractive power. At least one of an object-side surface and an image-side surface of the sixth lens may be a convex surface. Alternatively, the image-side surface of the sixth lens may be a convex surface.

In an exemplary implementation, the seventh lens may have negative refractive power. At least one of an object-side surface and an image-side surface of the seventh lens may be a concave surface. Alternatively, the image-side surface of the seventh lens may be a concave surface.

In an exemplary implementation, a distance TTL from an object-side surface of the first lens to an imaging plane of the optical imaging lens assembly on the optical axis and half of a diagonal length ImgH of an effective pixel area on the imaging plane of the optical imaging lens assembly may satisfy: TTL/ImgH≤1.5. When TTL and ImgH satisfy TTL/ImgH≤1.5, it is beneficial to ultra-thin and miniaturization of the system.

In an exemplary implementation, a maximum field-of-view FOV of the optical imaging lens assembly may satisfy: FOV>100°. When FOV satisfies the above condition, it is beneficial to obtain a larger field-of-view and improve the system's ability to collect object information. For example, FOV may satisfy FOV>105°.

In an exemplary implementation, a radius of curvature R9 of an object-side surface of the fifth lens, a radius of curvature R10 of an image-side surface of the fifth lens, and an effective focal length f of the optical imaging lens assembly may satisfy: 0<(R9+R10)/f<2.0. For example, R9, R10 and f may satisfy: 1.2<(R9+R10)/f<2.0. When (R9+R10)/f satisfies the above condition, it is beneficial to reduce a distortion value of the lens assembly, so as to obtain an optical lens assembly having large field-of-view and small distortion characteristics.

In an exemplary implementation, a radius of curvature R10 of an image-side surface of the fifth lens, and an effective focal length f of the optical imaging lens assembly may satisfy: $0.5<R10/f<1.0$. Reasonably configuring the refractive power of the fifth lens is beneficial to correct a chromatic aberration of the optical lens assembly, and at the same time, is beneficial to ensure system compactness of the optical lens assembly.

In an exemplary implementation, an effective focal length f4 of the fourth lens, the maximum field-of-view FOV of the optical imaging lens assembly, and a radius of curvature R9 of an object-side surface of the fifth lens may satisfy: $3.5<|f4\times\tan(FOV/2)|/R9<5.5$. Reasonably configuring the above conditional formula is beneficial to obtain a larger field-of-view while ensuring the compactness of the optical lens assembly.

In an exemplary implementation, a combined focal length f12 of the first lens and the second lens, and an effective focal length f of the optical imaging lens assembly may satisfy: $2.0 \leq f12/f \leq 3.2$. By reasonably distributing the focal length of the lens assembly, it is beneficial to correct an off-axis field-of-view, the chromatic aberration and a field curvature, and improve the clarity of imaging.

In an exemplary implementation, a center thickness CT4 of the fourth lens along the optical axis, a center thickness CT5 of the fifth lens along the optical axis, and a spacing distance T45 between the fourth lens and the fifth lens along the optical axis may satisfy: $2.0 \leq (CT4+CT5)/T45 \leq 4.5$. By controlling the center thicknesses of the lenses and the spacing distance on the axis, it is beneficial to ensure the system compactness of the optical lens assembly, at the same time reduce the sensitivity of spacing thickness to the field curvature, and help improve the assembly yield of the lens assembly.

In an exemplary implementation, an axial distance SAG61 from an intersection of an object-side surface of the sixth lens and the optical axis to a vertex of an effective radius of the object-side surface of the sixth lens, and an axial distance SAG62 from an intersection of an image-side surface of the sixth lens and the optical axis to a vertex of an effective radius of the image-side surface of the sixth lens may satisfy: $3.4 \leq SAG62/SAG61 \leq 9.8$. By constraining the ratio of the sagittal height of the object-side surface and the image-side surface of the sixth lens at the vertex of the effective radius, it is beneficial to control the image-side surface of the sixth lens not to be excessively curved, so that it can meet the requirements of processability and manufacturability. At the same time, it is beneficial to correct an external field-of-view distortion of the lens assembly.

In an exemplary implementation, a center thickness CT6 of the sixth lens along the optical axis and an edge thickness ET6 of the sixth lens may satisfy: $3.0 \leq CT6/ET6 \leq 4.0$. By constraining the thickness ratio of the sixth lens within an effective diameter range, the requirements of processability and manufacturability of the sixth lens may be met.

In an exemplary implementation, an effective focal length f2 of the second lens, an effective focal length f3 of the third lens, and a combined focal length f123 of the first lens, the second lens, and the third lens may satisfy: $3.0 \leq f2/f123+f3/f123 \leq 4.5$. Reasonably configuring the effective focal lengths of the second lens and the third lens is beneficial to correct a spherical aberration and axial chromatic aberration of the optical lens assembly and improve an imaging quality of the lens assembly. At the same time, it is beneficial to achieve the characteristics of large aperture and large field-of-view of the lens assembly.

In an exemplary implementation, an effective focal length f2 of the second lens and an effective focal length f3 of the third lens may satisfy: $0.5 \leq f2/f3 \leq 1.5$. Reasonably controlling of the ratio of the second lens to the third lens is beneficial to correct an off-axis field curvature of the optical lens assembly and improve the imaging quality.

In an exemplary implementation, a center thickness CT1 of the first lens along the optical axis, a center thickness CT2 of the second lens along the optical axis, a center thickness CT3 of the third lens along the optical axis, a center thickness CT4 of the fourth lens along the optical axis, a center thickness CT5 of the fifth lens along the optical axis, a center thickness CT6 of the sixth lens along the optical axis, and a center thickness CT7 of the seventh lens along the optical axis may satisfy: $1.0 \leq (CT1+CT2+CT3+CT4+CT5)/(CT6+CT7) \leq 1.5$. Reasonably configuring the center thickness of each lens is beneficial to ensure the system compactness of the optical lens assembly, and at the same time, is beneficial to meet the requirements of processability and manufacturability of the lenses.

In an exemplary implementation, a radius of curvature R5 of the object-side surface of the third lens, a radius of curvature R6 of the image-side surface of the third lens, and an effective focal length f3 of the third lens may satisfy: $-4.0 \leq (R5+R6)/f3 \leq -1.0$. Reasonably configuring the ratio of the radius of curvature to the focal length of the third lens is beneficial to reduce an incident angle of light beam on the lens, which in turn is beneficial to subsequent correction of off-axis aberrations by the lens.

In an exemplary implementation, a sum of spacing distances ΣAT of any two adjacent lenses from the first lens to the seventh lens along the optical axis, and a sum of center distances ΣCT of the first lens to the seventh lens respectively along the optical axis may satisfy: $1.5 \leq \Sigma CT/\Sigma AT \leq 2.3$. Reasonably configuring the center thickness and the axial spacing distance of each lens group is beneficial to ensure the system compactness of the optical lens assembly, and is beneficial to meet the requirement of ultra-thinness.

In the implementations of the present disclosure, at least one of the surfaces of the lenses is an aspheric surface, that is, at least one of the surfaces from the object-side surface of the first lens to the image-side surface of the seventh lens is an aspheric surface. The characteristic of the aspheric lens is: the curvature is continuously changing from the center of the lens to the periphery of the lens. Unlike the spherical lens with a constant curvature from the center of the lens to the periphery, the aspheric lens has a better radius of curvature characteristic, having advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens and the seventh lens is an aspheric surface. Alternatively, the object-side surface and the image-side surface of each of the first lens, the second lens, the third lens, the fourth lens, the fifth lens, the sixth lens and the seventh lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having seven lenses is described as an example in the implementations, the optical imaging lens assembly is not limited to include seven lenses. If desired, the optical imaging lens assembly may also include other numbers of lenses.

Specific Embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly along an optical axis from an object side to an image side sequentially includes: a first lens E1, a second lens E2, a diaphragm STO, a third lens E3, a fourth lens E4, a fifth lens E5, a sixth lens E6, a seventh lens E7, an optical filter E8 and an imaging plane S17.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a concave surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and is finally imaged on the imaging plane S17.

Table 1 is a table illustrating basic parameters of the optical imaging lens assembly of Embodiment 1, where the units for the radius of curvature, the thickness/distance and the focal length are millimeter (mm).

TABLE 1

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | −12.5536 | 0.2956 | 1.54 | 55.7 | −12.64 | −7.1242 |
| S2 | Aspheric | 15.4590 | 0.5218 | | | | 84.4532 |
| S3 | Aspheric | 2.2042 | 0.5853 | 1.54 | 56.0 | 5.16 | 0.1499 |
| S4 | Aspheric | 9.1757 | 0.0848 | | | | 9.2186 |
| STO | Spherical | Infinite | 0.2314 | | | | |
| S5 | Aspheric | −14.4005 | 0.5262 | 1.54 | 56.0 | 7.01 | −11.0738 |
| S6 | Aspheric | −3.0631 | 0.0400 | | | | −0.0304 |
| S7 | Aspheric | −17.0133 | 0.2600 | 1.67 | 19.2 | −10.00 | 99.0000 |
| S8 | Aspheric | 11.2923 | 0.2632 | | | | −35.2290 |
| S9 | Aspheric | 3.0859 | 0.3000 | 1.67 | 19.2 | −121.99 | −0.0498 |
| S10 | Aspheric | 2.8579 | 0.3621 | | | | −0.0164 |
| S11 | Aspheric | −13.6620 | 0.9735 | 1.55 | 48.0 | 2.27 | 7.1443 |
| S12 | Aspheric | −1.1832 | 0.5139 | | | | −0.9820 |
| S13 | Aspheric | −8.2371 | 0.3500 | 1.59 | 31.2 | −2.27 | −1.0791 |
| S14 | Aspheric | 1.6509 | 0.3927 | | | | −0.9907 |
| S15 | Spherical | Infinite | 0.2100 | 1.51 | 64.2 | | |
| S16 | Spherical | Infinite | 0.6200 | | | | |
| S17 | Spherical | Infinite | Infinite | | | | |

In Embodiment 1, an effective focal length of the optical imaging lens assembly is f=3.56 mm, a distance from the object-side surface S1 of the first lens E1 to the imaging plane S17 on the optical axis is TTL=6.53 mm, half of a diagonal length of an effective pixel area on the imaging plane S17 is ImgH=4.80 mm, half of a maximum field-of-view of the optical imaging lens assembly is Semi-FOV=53.39°, and an F number is Fno=1.95.

In Embodiment 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1 to S14 in Embodiment 1.

TABLE 2

| Surface number | A4 | A6 | A8 | A10 | A12 |
|---|---|---|---|---|---|
| S1  | 1.4120E−01  | −9.5589E−02 | 8.3229E−02  | −6.0545E−02 | 3.1427E−02  |
| S2  | 1.9357E−01  | −1.5737E−01 | 2.4247E−01  | −2.9350E−01 | 2.5072E−01  |
| S3  | 3.6047E−02  | −7.1842E−02 | 2.3443E−01  | −5.4655E−01 | 8.3727E−01  |
| S4  | −4.2704E−03 | −6.0721E−02 | 3.0449E−01  | −9.5610E−01 | 1.7931E+00  |
| S5  | −3.5217E−02 | −4.4074E−02 | 1.7046E−01  | −8.1362E−01 | 2.2584E+00  |
| S6  | −8.3425E−03 | −2.0858E−01 | −1.8535E−01 | 2.1152E+00  | −5.5274E+00 |
| S7  | −1.5361E−02 | −7.0410E−02 | −7.3613E−01 | 3.1206E+00  | −6.4903E+00 |
| S8  | −5.6961E−02 | 1.0522E−01  | −3.7789E−01 | 6.7955E−01  | −7.6058E−01 |
| S9  | −1.6698E−01 | 1.8173E−01  | −2.1384E−01 | 1.5150E−01  | −4.8573E−02 |
| S10 | −1.6434E−01 | 1.9305E−01  | −2.1816E−01 | 1.6325E−01  | −8.0525E−02 |
| S11 | −9.1617E−02 | 1.4596E−01  | −1.5652E−01 | 1.2243E−01  | −6.7380E−02 |
| S12 | 8.8278E−02  | −4.3645E−02 | 2.4446E−02  | −1.6394E−02 | 1.0412E−02  |
| S13 | 3.4465E−02  | −5.1590E−02 | 2.0220E−02  | −4.0901E−03 | 5.0404E−04  |
| S14 | −1.1834E−01 | 3.4841E−02  | −8.8122E−03 | 1.6238E−03  | −2.0478E−04 |

| Surface number | A14 | A16 | A18 | A20 |
|---|---|---|---|---|
| S1  | −1.0926E−02 | 2.3867E−03  | −2.9622E−04 | 1.5973E−05  |
| S2  | −1.4377E−01 | 5.3623E−02  | −1.2224E−02 | 1.2956E−03  |
| S3  | −8.3625E−01 | 5.2043E−01  | −1.8647E−01 | 2.9602E−02  |
| S4  | −2.0905E+00 | 1.4706E+00  | −5.6862E−01 | 9.3224E−02  |
| S5  | −3.8034E+00 | 3.7096E+00  | −1.9199E+00 | 4.0482E−01  |
| S6  | 7.6859E+00  | −6.1919E+00 | 2.7313E+00  | −5.1224E−01 |
| S7  | 7.9838E+00  | −5.9204E+00 | 2.4519E+00  | −4.3574E−01 |
| S8  | 5.3611E−01  | −2.3221E−01 | 5.6443E−02  | −5.7849E−03 |
| S9  | −4.7331E−03 | 8.8953E−03  | −2.6794E−03 | 2.8064E−04  |
| S10 | 2.6157E−02  | −5.3685E−03 | 6.2789E−04  | −3.1805E−05 |
| S11 | 2.3995E−02  | −5.1423E−03 | 5.9986E−04  | −2.9264E−05 |
| S12 | −3.8938E−03 | 7.8819E−04  | −8.1391E−05 | 3.3799E−06  |
| S13 | −3.9580E−05 | 1.9440E−06  | −5.4575E−08 | 6.6891E−10  |
| S14 | 1.6929E−05  | −8.6650E−07 | 2.4702E−08  | −2.9822E−10 |

FIG. 2A illustrates the longitudinal aberration curve of the optical imaging lens assembly according to Embodiment 1, representing deviations of focal points converged by light of different wavelengths after passing through the lens assembly. FIG. 2B illustrates the astigmatic curve of the optical imaging lens assembly according to Embodiment 1, representing a curvature of a tangential plane and a curvature of a sagittal plane. FIG. 2C illustrates the distortion curve of the optical imaging lens assembly according to Embodiment 1, representing the amounts of distortion corresponding to different image heights. FIG. 2D illustrates the lateral color curve of the optical imaging lens assembly according to Embodiment 1, representing deviations of different image heights on an imaging plane after light passes through the lens assembly. It can be seen from FIG. 2A to FIG. 2D that the optical imaging lens assembly provided in Embodiment 1 can achieve good imaging quality.

Embodiment 2

Figure 3:
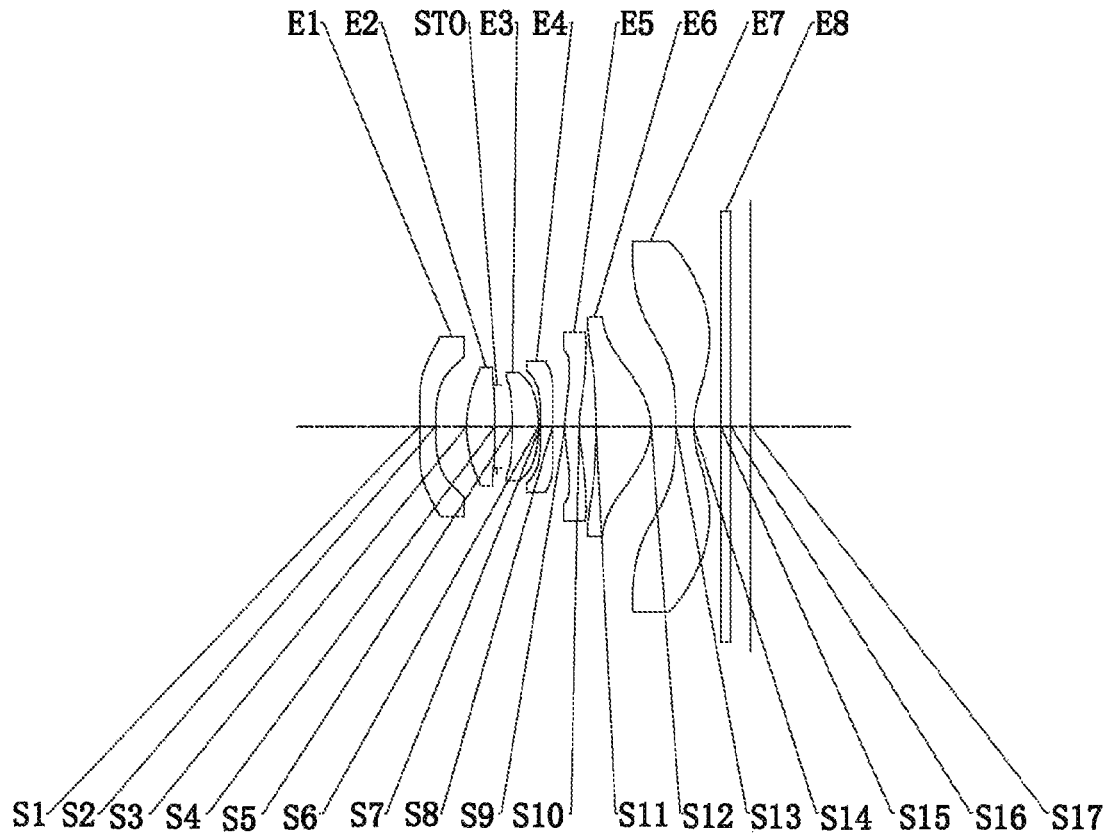
FIG. 3 is a schematic structural diagram illustrating an optical imaging lens assembly according to Embodiment 2 of the present disclosure.

An optical imaging lens assembly according to Embodiment 2 of the present disclosure is described below with reference to FIGS. 3-4D. In this Embodiment and the following Embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly along an optical axis from an object side to an image side sequentially includes: a first lens E1, a second lens E2, a diaphragm STO, a third lens E3, a fourth lens E4, a fifth lens E5, a sixth lens E6, a seventh lens E7, an optical filter E8 and an imaging plane S17.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a convex surface. The third lens E3 has positive refractive power, an object-side surface S5 of the third lens is a concave surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and is finally imaged on the imaging plane S17.

Table 3 is a table illustrating basic parameters of the optical imaging lens assembly of Embodiment 2, where the units for the radius of curvature, the thickness/distance and the focal length are millimeter (mm).

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −12.8744 | 0.3420 | 1.55 | 51.8 | −11.92 | 12.0659 |
| S2 | Aspheric | 13.5254 | 0.6580 | | | | 76.9341 |
| S3 | Aspheric | 2.8551 | 0.5997 | 1.54 | 56.0 | 4.84 | −0.0642 |
| S4 | Aspheric | −32.5110 | 0.0400 | | | | −95.1467 |
| STO | Spherical | Infinite | 0.3310 | | | | |
| S5 | Aspheric | −8.2063 | 0.5541 | 1.54 | 56.0 | 9.22 | −87.1527 |
| S6 | Aspheric | −3.1936 | 0.0400 | | | | −0.8834 |
| S7 | Aspheric | −26.1506 | 0.2600 | 1.67 | 19.2 | −12.03 | −15.0517 |
| S8 | Aspheric | 11.8520 | 0.2657 | | | | −15.0625 |
| S9 | Aspheric | 2.9648 | 0.3000 | 1.67 | 19.2 | −53.61 | 0.3151 |
| S10 | Aspheric | 2.6288 | 0.3575 | | | | 0.0339 |
| S11 | Aspheric | −46.3709 | 1.1677 | 1.56 | 43.0 | 2.22 | −59.0520 |
| S12 | Aspheric | −1.2310 | 0.5311 | | | | −0.9695 |
| S13 | Aspheric | −6.9190 | 0.3749 | 1.65 | 25.0 | −2.19 | −2.1605 |
| S14 | Aspheric | 1.7698 | 0.5809 | | | | −0.9831 |
| S15 | Spherical | Infinite | 0.2100 | 1.51 | 64.2 | | |
| S16 | Spherical | Infinite | 0.4200 | | | | |
| S17 | Spherical | Infinite | Infinite | | | | |

In Embodiment 2, an effective focal length of the optical imaging lens assembly is f=3.55 mm, a distance from the object-side surface S1 of the first lens E1 to the imaging plane S17 on the optical axis is TTL=7.03 mm, half of a diagonal length of an effective pixel area on the imaging plane S17 is ImgH=4.80 mm, half of a maximum field-of-view of the optical imaging lens assembly is Semi-FOV=53.42°, and an F number is Fno=1.95.

Table 4 shows high-order coefficients applicable to each aspheric surface in Embodiment 2, where the surface shape of each aspheric surface in Embodiment 2 may be defined by the formula (1) given in the above Embodiment 1.

TABLE 4

| Surface number | A4 | A6 | A8 | A10 | A12 |
|---|---|---|---|---|---|
| S1 | 1.2174E−01 | −7.3983E−02 | 6.1374E−02 | −4.3286E−02 | 2.2018E−02 |
| S2 | 1.6792E−01 | −1.2813E−01 | 2.0192E−01 | −2.3999E−01 | 1.9678E−01 |
| S3 | 3.1079E−02 | −8.8464E−02 | 3.2996E−02 | −7.8117E−01 | 1.1489E+00 |
| S4 | −9.8832E−03 | −3.2435E−02 | 1.4625E−01 | −4.3642E−01 | 7.9869E−01 |
| S5 | −4.8153E−02 | 6.0749E−02 | −3.0925E−01 | 8.4292E−01 | −1.4433E+00 |
| S6 | 3.0785E−02 | −6.7437E−01 | 2.3504E+00 | −5.3938E+00 | 7.9739E+00 |
| S7 | 2.7543E−02 | −5.8029E−01 | 1.7891E+00 | −3.8610E+00 | 5.4249E+00 |
| S8 | −2.6451E−02 | −8.0164E−02 | 2.1768E−01 | −4.1352E−01 | 4.8407E−01 |
| S9 | −1.2721E−01 | 3.8222E−02 | 4.5854E−02 | −1.3310E−01 | 1.5177E−01 |
| S10 | −1.3512E−01 | 9.8610E−02 | −8.2674E−02 | 4.7972E−02 | −1.8490E−02 |
| S11 | −7.2870E−02 | 1.0116E−01 | −1.0681E−01 | 8.7188E−02 | −5.0078E−02 |
| S12 | 8.4107E−02 | −4.7381E−02 | 2.6720E−02 | −1.5094E−02 | 7.9630E−03 |
| S13 | 2.8556E−02 | −4.6615E−02 | 1.9422E−02 | −4.2898E−03 | 5.9105E−04 |
| S14 | −1.0564E−01 | 2.8998E−02 | −6.8089E−03 | 1.1668E−03 | −1.3502E−04 |

| Surface number | A14 | A16 | A18 | A20 |
|---|---|---|---|---|
| S1 | −7.5561E−03 | 1.6228E−03 | −1.9605E−04 | 1.0192E−05 |
| S2 | −1.0351E−01 | 3.3154E−02 | −6.1567E−03 | 5.2989E−04 |
| S3 | −1.0631E+00 | 5.9726E−01 | −1.8682E−01 | 2.5033E−02 |
| S4 | −9.3897E−01 | 6.8546E−01 | −2.8121E−01 | 4.9333E−02 |
| S5 | 1.4600E+00 | −8.4115E−01 | 2.4635E−01 | −2.9139E−02 |
| S6 | −7.5797E+00 | 4.4709E+00 | −1.4853E+00 | 2.1122E−01 |
| S7 | −4.9602E+00 | 2.8420E+00 | −9.2221E−01 | 1.2915E−01 |
| S8 | −3.5746E−01 | 1.6247E−01 | −4.1493E−02 | 4.5855E−03 |
| S9 | −9.4823E−02 | 3.3800E−02 | −6.4898E−03 | 5.2085E−04 |
| S10 | 5.1123E−03 | −1.0319E−03 | 1.3312E−04 | −7.8221E−06 |
| S11 | 1.8369E−02 | −4.0205E−03 | 4.7714E−04 | −2.3653E−05 |
| S12 | −2.6644E−03 | 5.0102E−04 | −4.8963E−05 | 1.9456E−06 |
| S13 | −5.2539E−05 | 2.9251E−06 | −9.2501E−08 | 1.2641E−09 |
| S14 | 1.0073E−05 | −4.5819E−07 | 1.1414E−08 | −1.1765E−10 |

Figure 4A:
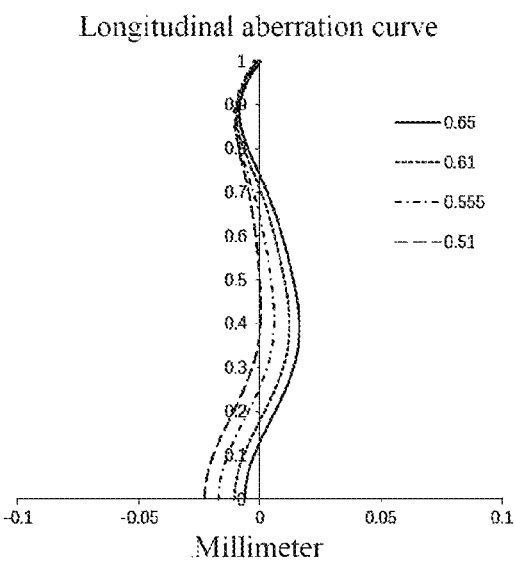
FIGS. 4A-4D respectively illustrate a longitudinal aberration curve, an astigmatic curve, a distortion curve and a lateral color curve of the optical imaging lens assembly according to Embodiment 2.
Figure 4B:
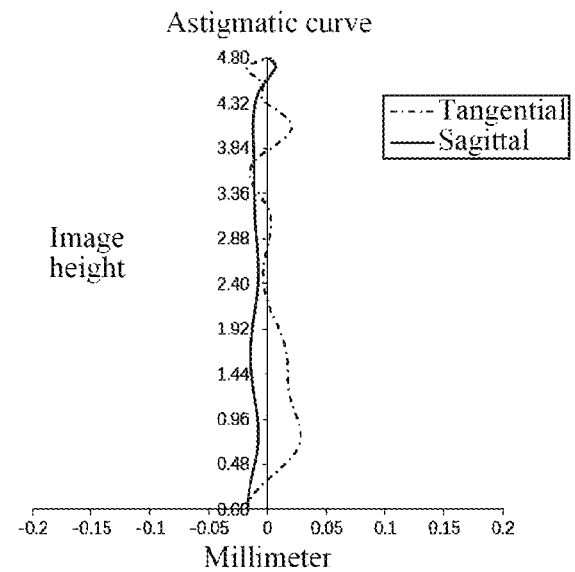
Figure 4C:
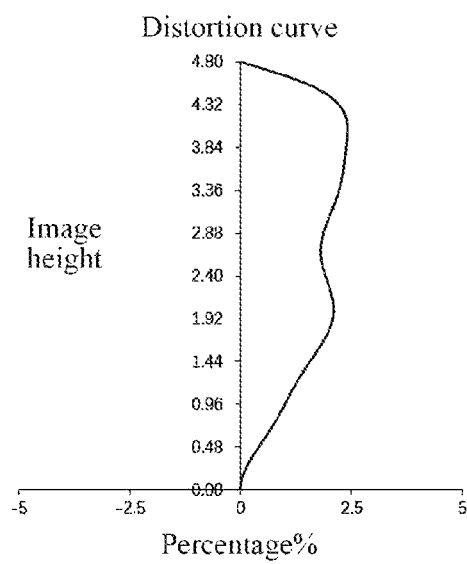
Figure 4D:
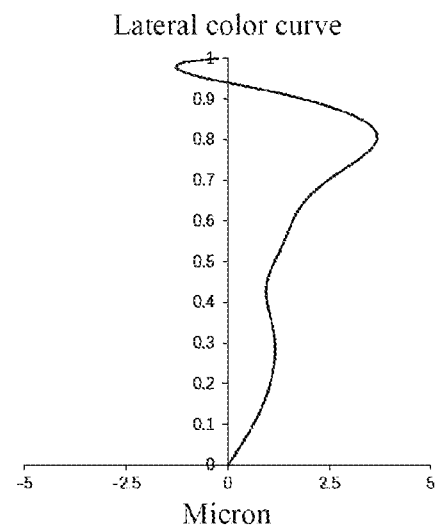

FIG. 4A illustrates the longitudinal aberration curve of the optical imaging lens assembly according to Embodiment 2, representing deviations of focal points converged by light of different wavelengths after passing through the lens assembly. FIG. 4B illustrates the astigmatic curve of the optical imaging lens assembly according to Embodiment 2, representing a curvature of a tangential plane and a curvature of a sagittal plane. FIG. 4C illustrates the distortion curve of the optical imaging lens assembly according to Embodiment 2, representing the amounts of distortion corresponding to different image heights. FIG. 4D illustrates the lateral color curve of the optical imaging lens assembly according to Embodiment 2, representing deviations of different image heights on an imaging plane after light passes through the lens assembly. It can be seen from FIG. 4A to FIG. 4D that the optical imaging lens assembly provided in Embodiment 2 can achieve good imaging quality.

Embodiment 3

Figure 5:
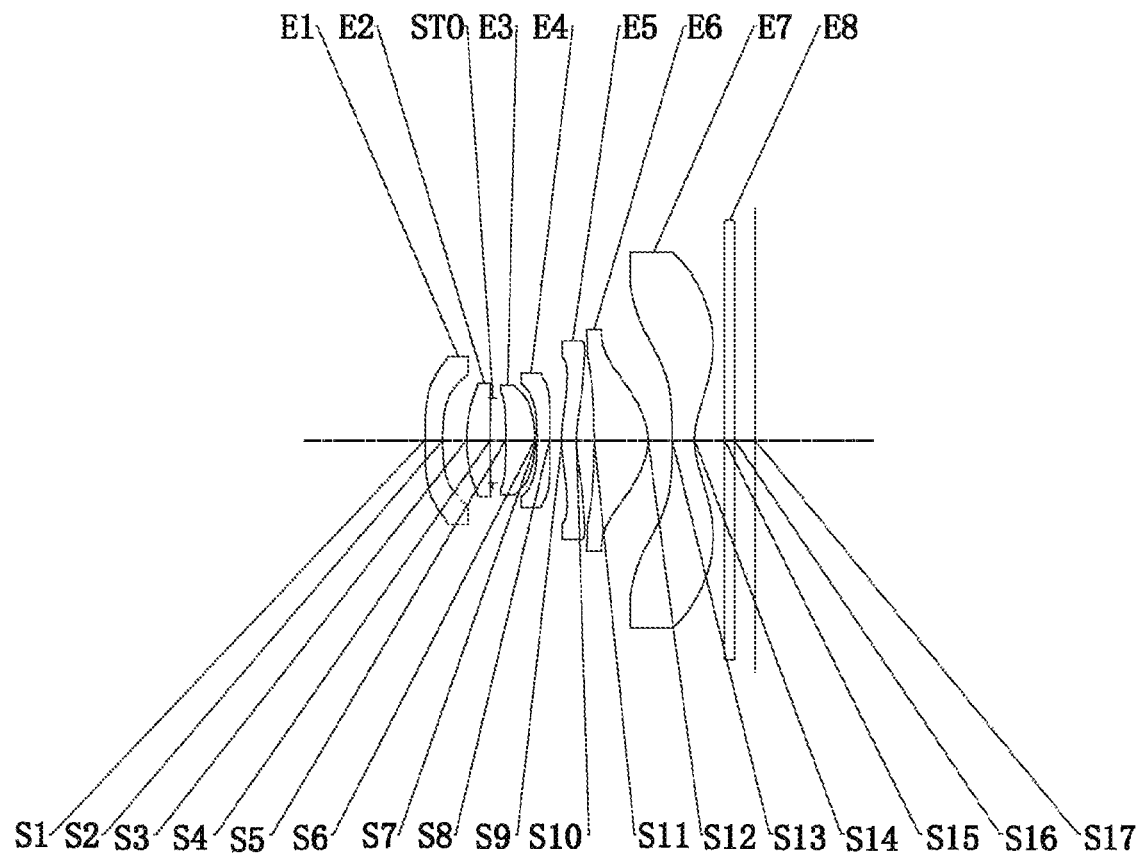
FIG. 5 is a schematic structural diagram illustrating an optical imaging lens assembly according to Embodiment 3 of the present disclosure.

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly along an optical axis from an object side to an image side sequentially includes: a first lens E1, a second lens E2, a diaphragm STO, a third lens E3, a fourth lens E4, a fifth lens E5, a sixth lens E6, a seventh lens E7, an optical filter E8 and an imaging plane S17.

The first lens E1 has negative refractive power, an object-side surface S1 of the first lens is a convex surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a concave surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and is finally imaged on the imaging plane S17.

Table 5 is a table illustrating basic parameters of the optical imaging lens assembly of Embodiment 3, where the units for the radius of curvature, the thickness/distance and the focal length are millimeter (mm).

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 159.9009 | 0.3666 | 1.54 | 56.0 | −19.06 | −99.0000 |
| S2 | Aspheric | 9.7594 | 0.4919 | | | | 47.6339 |
| S3 | Aspheric | 3.1089 | 0.4893 | 1.55 | 49.8 | 6.94 | −0.1987 |
| S4 | Aspheric | 15.5099 | 0.0518 | | | | −93.1983 |
| STO | Spherical | Infinite | 0.2686 | | | | |
| S5 | Aspheric | −18.6546 | 0.6036 | 1.54 | 56.0 | 5.75 | −92.0843 |
| S6 | Aspheric | −2.7181 | 0.0400 | | | | −0.7420 |
| S7 | Aspheric | −7.2549 | 0.2600 | 1.67 | 19.2 | −7.93 | −40.6172 |
| S8 | Aspheric | 20.8880 | 0.2538 | | | | 15.7728 |
| S9 | Aspheric | 2.9113 | 0.3000 | 1.67 | 19.2 | −60.57 | 0.2950 |
| S10 | Aspheric | 2.6051 | 0.3682 | | | | 0.0611 |
| S11 | Aspheric | −61.3157 | 1.1117 | 1.57 | 38.2 | 2.14 | −83.0887 |
| S12 | Aspheric | −1.2130 | 0.5010 | | | | −0.9886 |
| S13 | Aspheric | −8.9626 | 0.4624 | 1.64 | 23.9 | −2.18 | 0.1227 |
| S14 | Aspheric | 1.6922 | 0.6190 | | | | −1.0026 |
| S15 | Spherical | Infinite | 0.2100 | 1.51 | 64.2 | | |
| S16 | Spherical | Infinite | 0.4200 | | | | |
| S17 | Spherical | Infinite | Infinite | | | | |

An effective focal length of the optical imaging lens assembly is f=3.55 mm, a distance from the object-side surface S1 of the first lens E1 to the imaging plane S17 on the optical axis is TTL=6.82 mm, half of a diagonal length of an effective pixel area on the imaging plane S17 is ImgH=4.80 mm, half of a maximum field-of-view of the optical imaging lens assembly is Semi-FOV=53.41°, and an F number is Fno=1.95.

Table 6 shows high-order coefficients applicable to each aspheric surface in Embodiment 3, where the surface shape of each aspheric surface in Embodiment 3 may be defined by the formula (1) given in the above Embodiment 1.

TABLE 6

| Surface number | A4 | A6 | A8 | A10 | A12 |
|---|---|---|---|---|---|
| S1 | 9.8447E−02 | −4.8437E−02 | 4.2278E−02 | −3.0225E−02 | 1.5420E−02 |
| S2 | 1.5478E−01 | −1.2218E−01 | 2.3920E−01 | −3.3464E−01 | 3.2591E−01 |
| S3 | 4.0098E−02 | −1.0414E−01 | 4.0885E−01 | −1.0850E+00 | 1.8119E+00 |
| S4 | −6.5022E−03 | −5.0937E−02 | 2.1934E−01 | −7.3173E−01 | 1.4869E+00 |
| S5 | −3.8080E−02 | 2.5807E−02 | −2.5039E−01 | 7.7138E−01 | −1.4107E+00 |
| S6 | 3.8583E−02 | −7.5471E−01 | 2.6596E+00 | −6.1240E+00 | 9.1105E+00 |
| S7 | 4.1061E−02 | −7.1273E−01 | 2.2319E+00 | −4.7903E+00 | 6.7725E |
| S8 | −9.3729E−03 | −1.4976E−01 | 3.8106E−01 | −6.7374E−01 | 7.6771E−01 |
| S9 | −1.2925E−01 | 7.2018E−02 | −3.1054E−02 | −1.5467E−02 | 3.6170E−02 |
| S10 | −1.4157E−01 | 1.1302E−01 | −9.9658E−02 | 6.3854E−02 | −2.8636E−02 |
| S11 | −6.3715E−02 | 8.4587E−02 | −8.9665E−02 | 7.0914E−02 | −3.8650E−02 |
| S12 | 9.3781E−02 | −5.6721E−02 | 3.1658E−02 | −1.6228E−02 | 7.5387E−03 |

TABLE 6-continued

| | | | | |
|---|---|---|---|---|
| S13 | 4.2840E−02 | −6.3533E−02 | 2.9701E−02 | −7.8162E−03 | 1.3014E−03 |
| S14 | −1.0489E−01 | 2.6828E−02 | −5.6025E−03 | 8.5140E−04 | −8.7292E−05 |

| Surface number | A14 | A16 | A18 | A20 |
|---|---|---|---|---|
| S1 | −5.3243E−03 | 1.1819E−03 | −1.6115E−04 | 1.0727E−05 |
| S2 | −2.1076E−01 | 8.8388E−02 | −2.2533E−02 | 2.5807E−03 |
| S3 | −1.9211E+00 | 1.2427E+00 | −4.4858E−01 | 6.9423E−02 |
| S4 | −1.9184E+00 | 1.5336E+00 | −6.9070E−01 | 1.3369E−01 |
| S5 | 1.4276E+00 | −7.4014E−01 | 1.4615E−01 | 8.0230E−04 |
| S6 | −8.7303E+00 | 5.1873E+00 | −1.7317E+00 | 2.4633E−01 |
| S7 | −6.2766E+00 | 3.6672E+00 | −1.2248E+00 | 1.7875E−01 |
| S8 | −5.6430E−01 | 2.5798E−01 | −6.6708E−02 | 7.4922E−03 |
| S9 | −2.5221E−02 | 8.9756E−03 | −1.6581E−03 | 1.2616E−04 |
| S10 | 9.0193E−03 | −1.8872E−03 | 2.3054E−04 | −1.2270E−05 |
| S11 | 1.3440E−02 | −2.7962E−03 | 3.1605E−04 | −1.4935E−05 |
| S12 | −2.2521E−03 | 3.7551E−04 | −3.1704E−05 | 1.0428E−06 |
| S13 | −1.3860E−04 | 9.1031E−06 | −3.3459E−07 | 5.2539E−09 |
| S14 | 5.6025E−06 | −2.0147E−07 | 3.1257E−09 | −2.5246E−12 |

Figures 6A, 6B:
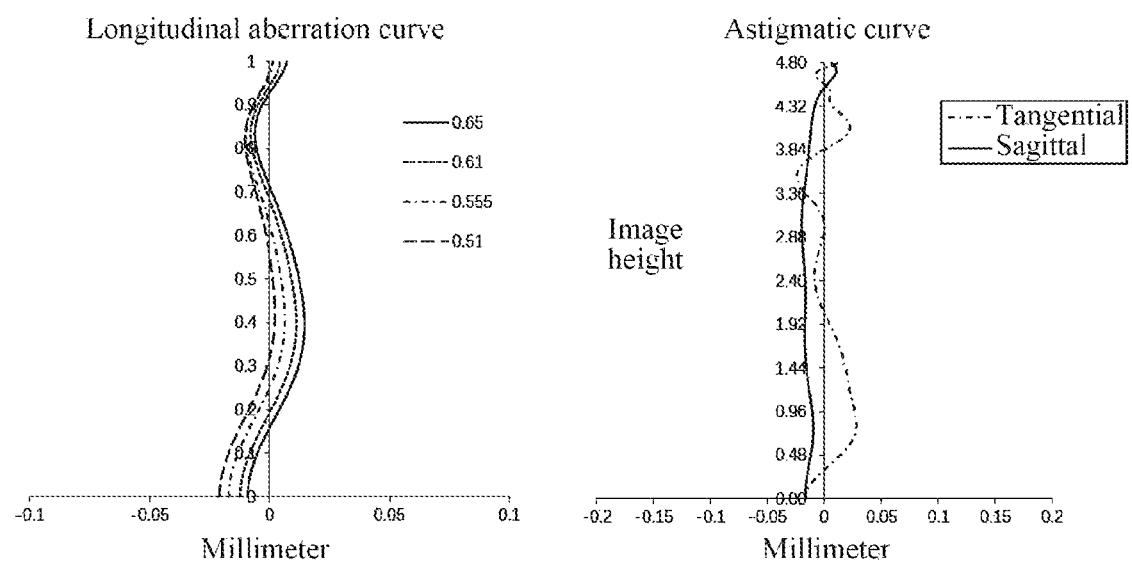

FIG. 6A illustrates the longitudinal aberration curve of the optical imaging lens assembly according to Embodiment 3, representing deviations of focal points converged by light of different wavelengths after passing through the lens assembly. FIG. 6B illustrates the astigmatic curve of the optical imaging lens assembly according to Embodiment 3, representing a curvature of a tangential plane and a curvature of a sagittal plane. FIG. 6C illustrates the distortion curve of the optical imaging lens assembly according to Embodiment 3, representing the amounts of distortion corresponding to different image heights. FIG. 6D illustrates the lateral color curve of the optical imaging lens assembly according to Embodiment 3, representing deviations of different image heights on an imaging plane after light passes through the lens assembly. It can be seen from FIG. 6A to FIG. 6D that the optical imaging lens assembly provided in Embodiment 3 can achieve good imaging quality.

Embodiment 4

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly along an optical axis from an object side to an image side sequentially includes: a first lens E1, a second lens E2, a diaphragm STO, a third lens E3, a fourth lens E4, a fifth lens E5, a sixth lens E6, a seventh lens E7, an optical filter E8 and an imaging plane S17.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a concave surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The fifth lens E5 has negative refractive power, an object-side surface S9 of the fifth lens is a convex surface, and an image-side surface S10 of the fifth lens is a concave surface. The sixth lens E6 has positive refractive power, an object-side surface S11 of the sixth lens is a convex surface, and an image-side surface S12 of the sixth lens is a convex surface. The seventh lens E7 has negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and is finally imaged on the imaging plane S17.

Table 7 is a table illustrating basic parameters of the imaging lens assembly of Embodiment 4, where the units for the radius of curvature, the thickness/distance and the focal length are millimeter (mm).

TABLE 7

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| S1 | Aspheric | −466.0962 | 0.3684 | 1.54 | 56.0 | −19.85 | −99.0000 |
| S2 | Aspheric | 11.0958 | 0.5353 | | | | 48.0945 |
| S3 | Aspheric | 3.2090 | 0.4777 | 1.55 | 48.5 | 7.23 | −0.3701 |
| S4 | Aspheric | 15.2722 | 0.0568 | | | | −77.3565 |
| STO | Spherical | Infinite | 0.2608 | | | | |
| S5 | Aspheric | −18.2651 | 0.6027 | 1.54 | 56.0 | 5.62 | −0.4645 |
| S6 | Aspheric | −2.6556 | 0.0400 | | | | −0.7444 |
| S7 | Aspheric | −6.3643 | 0.2600 | 1.67 | 19.2 | −7.25 | −36.3891 |
| S8 | Aspheric | 21.7516 | 0.2451 | | | | 8.5882 |
| S9 | Aspheric | 2.7876 | 0.3000 | 1.67 | 19.2 | −63.00 | 0.3589 |

TABLE 7-continued

| Surface number | Surface type | Radius of curvature | Thickness/ Distance | Material Refractive index | Material Abbe number | Focal length | Conic coefficient |
|---|---|---|---|---|---|---|---|
| S10 | Aspheric | 2.5028 | 0.3554 | | | | −0.0024 |
| S11 | Aspheric | 50.1113 | 1.1830 | 1.57 | 40.6 | 2.14 | −98.6532 |
| S12 | Aspheric | −1.2402 | 0.4903 | | | | −0.9892 |
| S13 | Aspheric | −8.6154 | 0.5117 | 1.63 | 24.8 | −2.21 | −0.7323 |
| S14 | Aspheric | 1.7089 | 0.6233 | | | | −1.0004 |
| S15 | Spherical | Infinite | 0.2100 | 1.51 | 64.2 | | |
| S16 | Spherical | Infinite | 0.4200 | | | | |
| S17 | Spherical | Infinite | Infinite | | | | |

An effective focal length of the optical imaging lens assembly is f=3.56 mm, a distance from the object-side surface S1 of the first lens E1 to the imaging plane S17 on the optical axis is TTL=6.94 mm, half of a diagonal length of an effective pixel area on the imaging plane S17 is ImgH=4.80 mm, half of a maximum field-of-view of the optical imaging lens assembly is Semi-FOV=53.46°, and an F number is Fno=1.96.

Table 8 shows high-order coefficients applicable to each aspheric surface in Embodiment 4, where the surface shape of each aspheric surface in Embodiment 4 may be defined by the formula (1) given in the above Embodiment 1.

TABLE 8

| Surface number | A4 | A6 | A8 | A10 | A12 |
|---|---|---|---|---|---|
| S1 | 9.8057E−02 | −5.0332E−02 | 4.6960E−02 | −3.6402E−02 | 2.0470E−02 |
| S2 | 1.5125E−01 | −1.1763E−01 | 2.3068E−01 | −3.3199E−01 | 3.4403E−01 |
| S3 | 3.7043E−02 | −9.5728E−02 | 3.8157E−01 | −1.0108E+00 | 1.6764E+00 |
| S4 | −7.2424E−03 | −4.3541E−02 | 1.7063E−01 | −5.2400E−01 | 9.7950E−01 |
| S5 | −3.8750E−02 | 6.5765E−03 | −1.1530E−01 | 2.5356E−01 | −2.2915E−01 |
| S6 | 5.0184E−02 | −8.2626E−01 | 2.7932E+00 | −6.0347E+00 | 8.3706E+00 |
| S7 | 5.2776E−02 | −7.8859E−01 | 2.3676E+00 | −4.7510E+00 | 6.2767E+00 |
| S8 | −2.3212E−03 | −1.6857E−01 | 3.8409E−01 | −6.0455E−01 | 6.2496E−01 |
| S9 | −1.2657E−01 | 6.7246E−02 | −1.9028E−02 | −2.7917E−02 | 4.1783E−02 |
| S10 | −1.4467E−01 | 1.1260E−01 | −9.2673E−02 | 5.5987E−02 | −2.4259E−02 |
| S11 | −6.0444E−02 | 7.6669E−02 | −8.4399E−02 | 6.9352E−02 | −3.8268E−02 |
| S12 | 9.4835E−02 | −5.5827E−02 | 2.8210E−02 | −1.2929E−02 | 6.0205E−03 |
| S13 | 4.4485E−02 | −6.7620E−02 | 3.2875E−02 | −9.0440E−03 | 1.5734E−03 |
| S14 | −1.0147E−01 | 2.5081E−02 | −5.0054E−03 | 7.2074E−04 | −6.9426E−05 |

| Surface number | A14 | A16 | A18 | A20 |
|---|---|---|---|---|
| S1 | −7.8485E−03 | 1.9402E−03 | −2.8865E−04 | 1.9953E−05 |
| S2 | −2.4430E−01 | 1.1539E−01 | −3.3302E−02 | 4.3269E−03 |
| S3 | −1.7693E+00 | 1.1451E+00 | −4.1714E−01 | 6.5897E−02 |
| S4 | −1.1982E+00 | 9.5534E−01 | −4.5637E−01 | 9.9697E−02 |
| S5 | −2.0822E−01 | 5.9916E−01 | −4.4738E−01 | 1.0930E−01 |
| S6 | −7.4636E+00 | 4.1148E+00 | −1.2664E+00 | 1.6356E−01 |
| S7 | −5.4676E+00 | 3.0237E+00 | −9.6230E−01 | 1.3479E−01 |
| S8 | −4.2541E−01 | 1.8337E−01 | −4.5354E−02 | 4.9363E−03 |
| S9 | −2.5788E−02 | 8.5287E−03 | −1.4866E−03 | 1.0730E−04 |
| S10 | 7.5627E−03 | −1.5880E−03 | 1.9506E−04 | −1.0405E−05 |
| S11 | 1.3231E−02 | −2.7144E−03 | 3.0151E−04 | −1.3980E−05 |
| S12 | −1.8891E−03 | 3.3355E−04 | −3.0172E−05 | 1.0900E−06 |
| S13 | −1.7478E−04 | 1.1960E−05 | −4.5815E−07 | 7.5089E−09 |
| S14 | 4.1009E−06 | −1.2686E−07 | 1.1399E−09 | 1.8941E−11 |

Figure 8A:
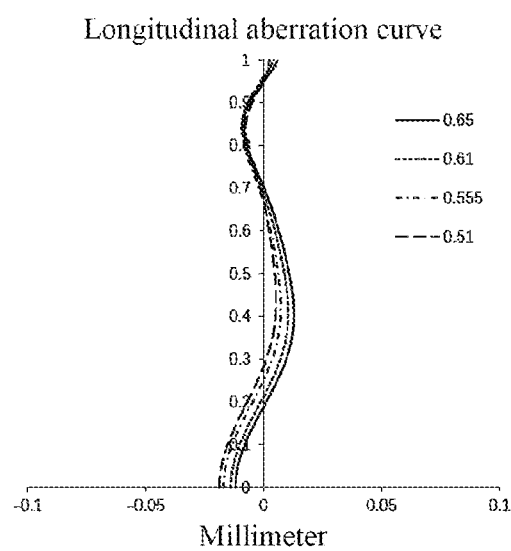
FIGS. 8A-8D respectively illustrate a longitudinal aberration curve, an astigmatic curve, a distortion curve and a lateral color curve of the optical imaging lens assembly according to Embodiment 4.
Figure 8B:
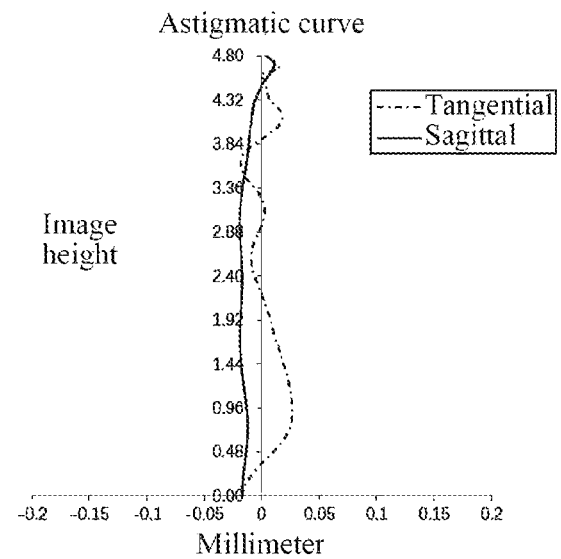
Figure 8C:
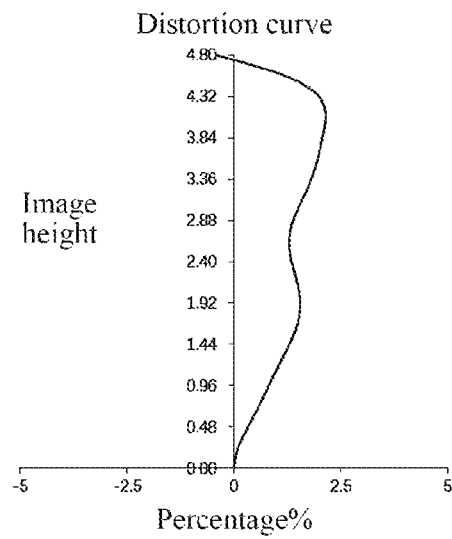
Figure 8D:
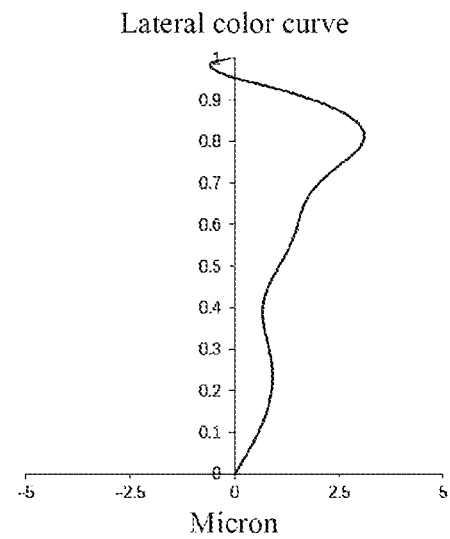

FIG. 8A illustrates the longitudinal aberration curve of the optical imaging lens assembly according to Embodiment 4, representing deviations of focal points converged by light of different wavelengths after passing through the lens assembly. FIG. 8B illustrates the astigmatic curve of the optical imaging lens assembly according to Embodiment 4, representing a curvature of a tangential plane and a curvature of a sagittal plane. FIG. 8C illustrates the distortion curve of the optical imaging lens assembly according to Embodiment 4, representing the amounts of distortion corresponding to different image heights. FIG. 8D illustrates the lateral color curve of the optical imaging lens assembly according to Embodiment 4, representing deviations of different image heights on an imaging plane after light passes through the lens assembly. It can be seen from FIG. 8A to FIG. 8D that the optical imaging lens assembly provided in Embodiment 4 can achieve good imaging quality.

Embodiment 5

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly along an optical axis from an object side to an image side sequentially includes: a first lens E1, a second lens E2, a diaphragm STO, a third lens E3, a fourth lens E4, a fifth lens E5, a sixth lens E6, a seventh lens E7, an optical filter E8 and an imaging plane S17.

The first lens E1 has negative refractive power, an object-side surface S1 of the first lens is a concave surface, and an image-side surface S2 of the first lens is a concave surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a concave surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The fifth lens E5 has positive refractive power, an object-side surface S9 of the fifth lens is a convex surface, and an image-side surface S10 of the fifth lens is a concave surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a concave surface, and an image-side surface S14 of the seventh lens is a concave surface. The optical filter E8 has an object-side surface S15 and an image-side surface S16. Light from an object sequentially passes through the respective surfaces S1 to S16 and is finally imaged on the imaging plane S17.

Table 9 is a table illustrating basic parameters of the optical imaging lens assembly of Embodiment 5, where the units for the radius of curvature, the thickness/distance and the focal length are millimeter (mm).

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −12.9025 | 0.3325 | 1.54 | 56.0 | −11.98 | 5.5659 |
| S2 | Aspheric | 13.3867 | 0.6649 | | | | 63.1558 |
| S3 | Aspheric | 2.5811 | 0.5831 | 1.54 | 56.0 | 5.16 | 0.0273 |
| S4 | Aspheric | 28.6348 | 0.0449 | | | | −78.7410 |
| STO | Spherical | Infinite | 0.3187 | | | | |
| S5 | Aspheric | −12.8055 | 0.5403 | 1.54 | 56.0 | 7.75 | −37.5957 |
| S6 | Aspheric | −3.2269 | 0.0400 | | | | −0.7328 |
| S7 | Aspheric | −17.6454 | 0.2600 | 1.67 | 19.2 | −8.76 | −99.0000 |
| S8 | Aspheric | 8.9767 | 0.2278 | | | | −59.1320 |
| S9 | Aspheric | 2.6792 | 0.3001 | 1.67 | 19.2 | 71.75 | −0.0144 |
| S10 | Aspheric | 2.7077 | 0.3764 | | | | 0.0381 |
| S11 | Aspheric | −24.6515 | 1.0654 | 1.56 | 46.6 | 2.27 | −18.4331 |
| S12 | Aspheric | −1.2258 | 0.4819 | | | | −0.9770 |
| S13 | Aspheric | −8.8856 | 0.4627 | 1.62 | 26.2 | −2.28 | −1.3100 |
| S14 | Aspheric | 1.7262 | 0.6001 | | | | −0.9877 |
| S15 | Spherical | Infinite | 0.2100 | 1.51 | 64.2 | | |
| S16 | Spherical | Infinite | 0.4200 | | | | |
| S17 | Spherical | Infinite | Infinite | | | | |

An effective focal length of the optical imaging lens assembly is f=3.51 mm, a distance from the object-side surface S1 of the first lens E1 to the imaging plane S17 on the optical axis is TTL=6.93 mm, half of a diagonal length of an effective pixel area on the imaging plane S17 is ImgH=4.80 mm, half of a maximum field-of-view of the optical imaging lens assembly is Semi-FOV=53.82°, and an F number is Fno=1.88.

Table 10 shows high-order coefficients applicable to each aspheric surface in Embodiment 5, where the surface shape of each aspheric surface in Embodiment 5 may be defined by the formula (1) given in the above Embodiment 1.

TABLE 10

| Surface number | A4 | A6 | A8 | A10 | A12 |
|---|---|---|---|---|---|
| S1 | 1.1727E−01 | −6.4281E−02 | 4.4194E−02 | −2.5232E−02 | 1.0343E−02 |
| S2 | 1.5493E−01 | −8.3308E−02 | 8.2657E−02 | −5.4490E−02 | 1.8015E−02 |
| S3 | 2.6119E−02 | −5.5197E−02 | 1.8544E−01 | −4.0334E−01 | 5.4557E−01 |
| S4 | −9.5298E−03 | −3.3281E−02 | 1.4627E−01 | −4.3594E−01 | 7.9869E−01 |
| S5 | −4.2942E−02 | 4.1584E−02 | −3.5856E−01 | 1.2006E+00 | −2.4629E+00 |
| S6 | 5.0161E−02 | −7.3074E−01 | 2.2640E+00 | −4.7266E+00 | 6.5004E+00 |
| S7 | 3.6370E−02 | −5.5734E−01 | 1.4999E+00 | −2.8940E+00 | 3.7275E+00 |
| S8 | −4.8753E−02 | 3.2337E−03 | 2.5463E−02 | −1.2171E−01 | 1.9305E−01 |
| S9 | −1.5536E−01 | 1.2212E−01 | −9.8940E−02 | 3.0766E−02 | 2.7167E−02 |
| S10 | −1.3874E−01 | 1.2941E−01 | −1.3206E−01 | 9.1643E−02 | −4.2377E−02 |
| S11 | −7.2739E−02 | 1.0629E−01 | −1.1617E−01 | 9.5883E−02 | −5.5342E−02 |
| S12 | 8.7444E−02 | −4.7290E−02 | 2.3223E−02 | −1.0894E−02 | 5.8387E−03 |
| S13 | 2.9972E−02 | −5.0023E−02 | 2.1998E−02 | −5.2106E−03 | 7.7544E−04 |
| S14 | −1.0743E−01 | 2.9911E−02 | −7.0710E−03 | 1.2149E−03 | −1.4127E−04 |

| Surface number | A14 | A16 | A18 | A20 |
|---|---|---|---|---|
| S1 | −2.8448E−03 | 4.7819E−04 | −4.3488E−05 | 1.6185E−06 |
| S2 | 2.7181E−03 | −4.2593E−03 | 1.0028E−03 | −4.4097E−05 |
| S3 | −4.6599E−01 | 2.4111E−01 | −6.9836E−02 | 8.8148E−03 |
| S4 | −9.3897E−01 | 6.8546E−01 | −2.8121E−01 | 4.9333E−02 |
| S5 | 3.1057E+00 | −2.3926E+00 | 1.0416E+00 | −1.9942E−01 |
| S6 | −5.8042E+00 | 3.2194E+00 | −1.0013E+00 | 1.3192E−01 |
| S7 | −3.1605E+00 | 1.6835E+00 | −5.0696E−01 | 6.5666E−02 |
| S8 | −1.6985E−01 | 8.6888E−02 | −2.4173E−02 | 2.8692E−03 |
| S9 | −3.2783E−02 | 1.4500E−02 | −3.0929E−03 | 2.6381E−04 |
| S10 | 1.3316E−02 | −2.7470E−03 | 3.3217E−04 | −1.7652E−05 |
| S11 | 2.0387E−02 | −4.4771E−03 | 5.3227E−04 | −2.6380E−05 |
| S12 | −2.0809E−03 | 4.0667E−04 | −4.0287E−05 | 1.5922E−06 |
| S13 | −7.4619E−05 | 4.4991E−06 | −1.5416E−07 | 2.2865E−09 |
| S14 | 1.0608E−05 | −4.8524E−07 | 1.2104E−08 | −1.2377E−10 |

Figures 10C, 10D:
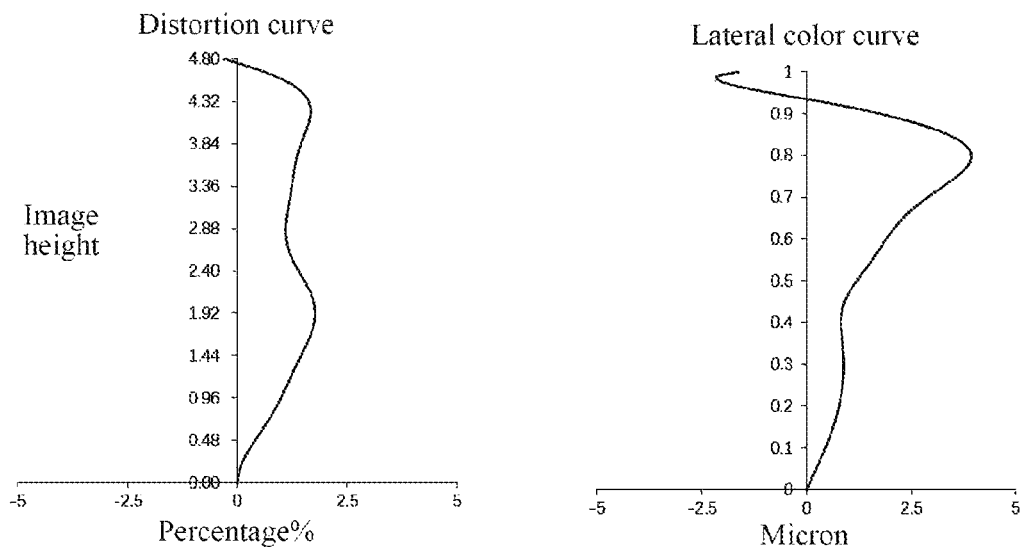

FIG. 10A illustrates the longitudinal aberration curve of the optical imaging lens assembly according to Embodiment 5, representing deviations of focal points converged by light of different wavelengths after passing through the lens assembly. FIG. 10B illustrates the astigmatic curve of the optical imaging lens assembly according to Embodiment 5, representing a curvature of a tangential plane and a curvature of a sagittal plane. FIG. 10C illustrates the distortion curve of the optical imaging lens assembly according to Embodiment 5, representing the amounts of distortion corresponding to different image heights. FIG. 10D illustrates the lateral color curve of the optical imaging lens assembly according to Embodiment 5, representing deviations of different image heights on an imaging plane after light passes through the lens assembly. It can be seen from FIG. 10A to FIG. 10D that the optical imaging lens assembly provided in Embodiment 5 can achieve good imaging quality.

Embodiment 6

Figure 11:
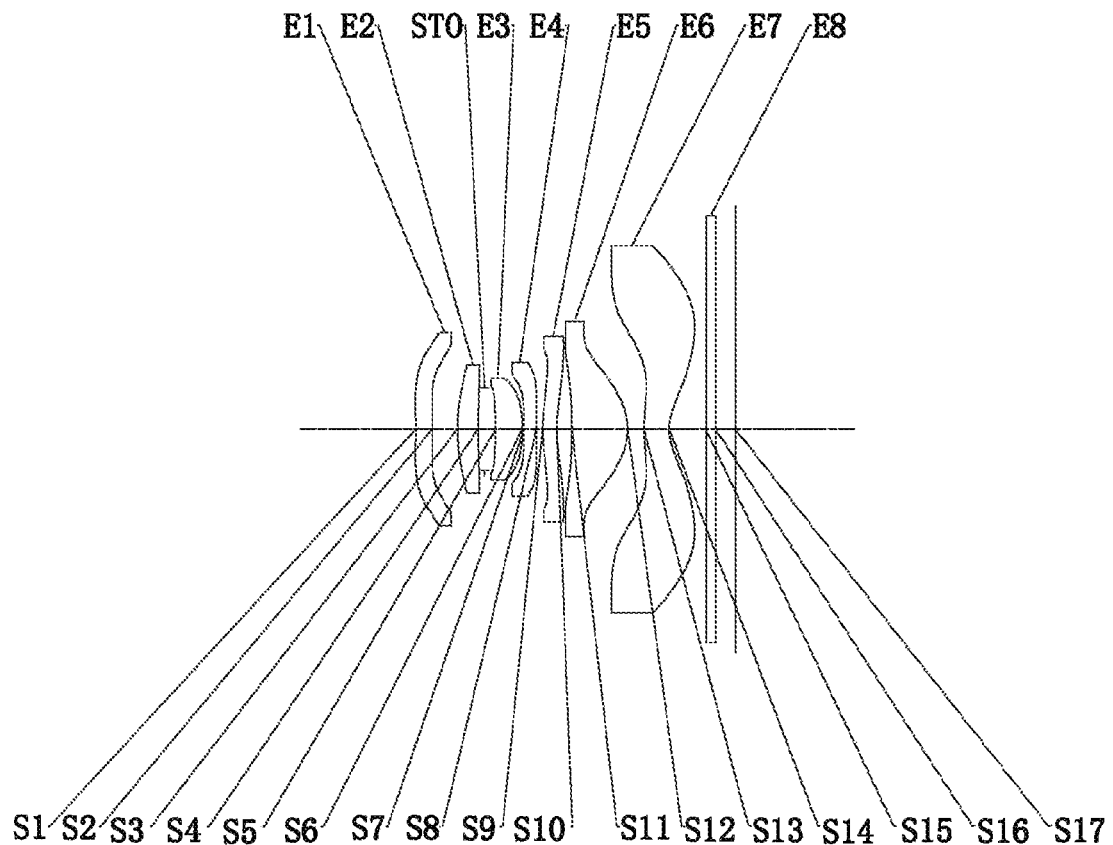
FIG. 11 is a schematic structural diagram illustrating an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram illustrating the optical imaging lens assembly according to Embodiment 6 of the present disclosure.

As shown in FIG. 11, the optical imaging lens assembly along an optical axis from an object side to an image side sequentially includes: a first lens E1, a second lens E2, a diaphragm STO, a third lens E3, a fourth lens E4, a fifth lens E5, a sixth lens E6, a seventh lens E7, an optical filter E8 and an imaging plane S17.

The first lens E1 has positive refractive power, an object-side surface S1 of the first lens is a concave surface, and an image-side surface S2 of the first lens is a convex surface. The second lens E2 has positive refractive power, an object-side surface S3 of the second lens is a convex surface, and an image-side surface S4 of the second lens is a concave surface. The third lens E3 has positive refractive power, an object-side surface S5 of the third lens is a concave surface, and an image-side surface S6 of the third lens is a convex surface. The fourth lens E4 has negative refractive power, an object-side surface S7 of the fourth lens is a concave surface, and an image-side surface S8 of the fourth lens is a concave surface. The fifth lens E5 has positive refractive power, an object-side surface S9 of the fifth lens is a convex surface, and an image-side surface S10 of the fifth lens is a concave surface. The sixth lens E6 has positive refractive power, an object-side surface S11 of the sixth lens is a concave surface, and an image-side surface S12 of the sixth lens is a convex surface. The seventh lens E7 has negative refractive power, an object-side surface S13 of the seventh lens is a convex surface, and an image-side surface S14 of the seventh lens is a concave surface. The optical filter E8 has an object-side surface S15 and an image-side surface S16. Light from an object sequentially passes through the respective surfaces S1 to S16 and is finally imaged on the imaging plane S17.

Table 11 is a table illustrating basic parameters of the optical imaging lens assembly of Embodiment 6, where the units for the radius of curvature, the thickness/distance and the focal length are millimeter (mm).

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | −11.8062 | 0.3499 | 1.54 | 56.0 | 77.53 | 6.8295 |
| S2 | Aspheric | −9.3264 | 0.5310 | | | | −2.8221 |
| S3 | Aspheric | 4.5997 | 0.4386 | 1.54 | 55.2 | 11.85 | 0.8292 |
| S4 | Aspheric | 15.3439 | 0.1346 | | | | 5.7773 |
| STO | Spherical | Infinite | 0.2361 | | | | |
| S5 | Aspheric | −11.9920 | 0.5657 | 1.54 | 56.0 | 8.18 | −2.1962 |
| S6 | Aspheric | −3.3050 | 0.0400 | | | | 0.0500 |
| S7 | Aspheric | −9.7885 | 0.2600 | 1.67 | 19.2 | −10.18 | −2.8111 |
| S8 | Aspheric | 23.6074 | 0.1298 | | | | −99.0000 |
| S9 | Aspheric | 3.1490 | 0.3005 | 1.67 | 19.2 | 51.82 | −0.0820 |
| S10 | Aspheric | 3.3267 | 0.3194 | | | | −0.0265 |
| S11 | Aspheric | −10.8995 | 1.1847 | 1.54 | 56.0 | 2.30 | −2.3961 |
| S12 | Aspheric | −1.1668 | 0.3429 | | | | −1.0004 |
| S13 | Aspheric | 4.8590 | 0.5365 | 1.59 | 33.7 | −2.58 | 0.0067 |
| S14 | Aspheric | 1.1087 | 0.7749 | | | | −0.9972 |
| S15 | Spherical | Infinite | 0.2100 | 1.51 | 64.2 | | |
| S16 | Spherical | Infinite | 0.4200 | | | | |
| S17 | Spherical | Infinite | Infinite | | | | |

An effective focal length of the optical imaging lens assembly is f=3.48 mm, a distance from the object-side surface S1 of the first lens E1 to the imaging plane S17 on the optical axis is TTL=6.77 mm, half of a diagonal length of an effective pixel area on the imaging plane S17 is ImgH=4.75 mm, half of a maximum field-of-view of the optical imaging lens assembly is Semi-FOV=53.97°, and an F number is Fno=1.85.

Table 12-1 and table 12-2 show high-order coefficients applicable to each aspheric surface in Embodiment 6, where the surface shape of each aspheric surface in Embodiment 6 may be defined by the formula (1) given in the above Embodiment 1.

TABLE 12-1

| Surface number | A4 | A6 | A8 | A10 |
|---|---|---|---|---|
| S1 | 7.0784E−02 | −3.8978E−02 | 5.4638E−02 | −6.1908E−02 |
| S2 | 1.1386E−01 | −1.3403E−01 | 3.3939E−01 | −6.3950E−01 |
| S3 | 2.9460E−02 | −5.8409E−02 | 1.2848E−01 | −2.2943E−01 |
| S4 | 7.6413E−04 | −3.4000E−02 | 8.5122E−02 | −1.7364E−01 |
| S5 | −5.1716E−02 | 1.8255E−01 | −1.5252E+00 | 6.6840E+00 |
| S6 | −7.6554E−02 | −3.8502E−02 | −5.3513E−01 | 2.5893E+00 |
| S7 | −1.1717E−02 | −1.6313E−01 | 6.3965E−02 | 2.7588E−01 |
| S8 | −2.2422E−02 | 1.0746E−02 | −7.5215E−02 | 8.4186E−02 |
| S9 | −1.1971E−01 | 7.3419E−02 | −1.5751E−01 | −6.0404E−02 |
| S10 | −7.5444E−02 | 5.3135E−03 | 4.4521E−02 | −6.2414E−02 |

TABLE 12-1-continued

| | | | |
|---|---|---|---|
| S11 | −2.2924E−03 | 2.6202E−02 | −1.1501E−01 | 1.8283E−01 |
| S12 | 1.5695E−01 | −1.7605E−01 | 1.4180E−01 | −8.6149E−02 |
| S13 | 1.3226E−02 | −1.4378E−01 | 1.1208E−01 | −4.6818E−02 |
| S14 | −2.0967E−01 | 7.2416E−02 | −1.8492E−02 | 3.3919E−03 |

| Surface number | A12 | A14 | A16 |
|---|---|---|---|
| S1 | 4.8098E−02 | −2.4642E−02 | 8.1762E−03 |
| S2 | 8.2391E−01 | −7.2400E−01 | 4.3702E−01 |
| S3 | 2.6892E−01 | −2.0485E−01 | 9.4602E−02 |
| S4 | 2.2818E−01 | −1.9976E−01 | 1.1623E−01 |
| S5 | −1.8282E+01 | 3.1215E+01 | −3.2498E+01 |
| S6 | −5.9398E+00 | 7.8605E+00 | −6.1559E+00 |
| S7 | −6.6095E−01 | 6.8626E−01 | −3.9185E−01 |
| S8 | −3.2733E−02 | −1.9873E−02 | 2.5677E−02 |
| S9 | 8.8420E−02 | −5.7549E−02 | 2.0245E−02 |
| S10 | 4.1771E−02 | −1.5498E−02 | 3.2607E−03 |
| S11 | −1.5083E−01 | 7.2798E−02 | −2.1325E−02 |
| S12 | 3.9748E−02 | −1.2504E−02 | 2.5247E−03 |
| S13 | 1.2250E−02 | −2.1113E−03 | 2.4396E−04 |
| S14 | −4.4515E−04 | 4.0900E−05 | −2.5402E−06 |

TABLE 12-2

| Surface number | A18 | A20 | A22 | A24 |
|---|---|---|---|---|
| S1 | −1.6850E−03 | 1.9486E−04 | −9.6110E−06 | 0.0000E+00 |
| S2 | −1.8056E−01 | 5.0009E−02 | −8.8601E−03 | 9.0731E−04 |
| S3 | −2.3339E−02 | 2.3036E−03 | 0.0000E+00 | 0.0000E+00 |
| S4 | −3.9478E−02 | 5.6450E−03 | 0.0000E+00 | 0.0000E+00 |
| S5 | 1.8857E+01 | −4.6793E+00 | 0.0000E+00 | 0.0000E+00 |
| S6 | 2.6579E+00 | −4.8969E−01 | 0.0000E+00 | 0.0000E+00 |
| S7 | 1.2591E−01 | −1.8360E−02 | 0.0000E+00 | 0.0000E+00 |
| S8 | −9.9184E−03 | 1.3960E−03 | 0.0000E+00 | 0.0000E+00 |
| S9 | −3.7628E−03 | 2.9080E−04 | 0.0000E+00 | 0.0000E+00 |
| S10 | −3.6636E−04 | 1.7157E−05 | 0.0000E+00 | 0.0000E+00 |
| S11 | 3.7357E−03 | −3.6038E−04 | 1.4743E−05 | 0.0000E+00 |
| S12 | −3.1308E−04 | 2.1825E−05 | −6.5919E−07 | 0.0000E+00 |
| S13 | −1.8757E−05 | 9.2257E−07 | −2.6311E−08 | 3.3140E−10 |
| S14 | 1.0097E−07 | −2.3124E−09 | 2.3196E−11 | 0.0000E+00 |

Figure 12A:
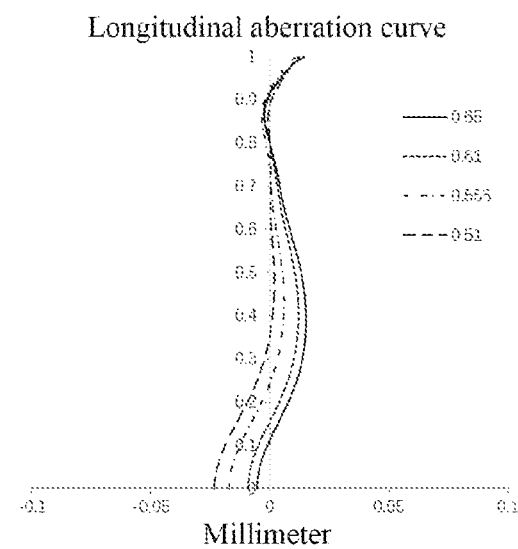
FIGS. 12A-12D respectively illustrate a longitudinal aberration curve, an astigmatic curve, a distortion curve and a lateral color curve of the optical imaging lens assembly according to Embodiment 6.
Figure 12B:
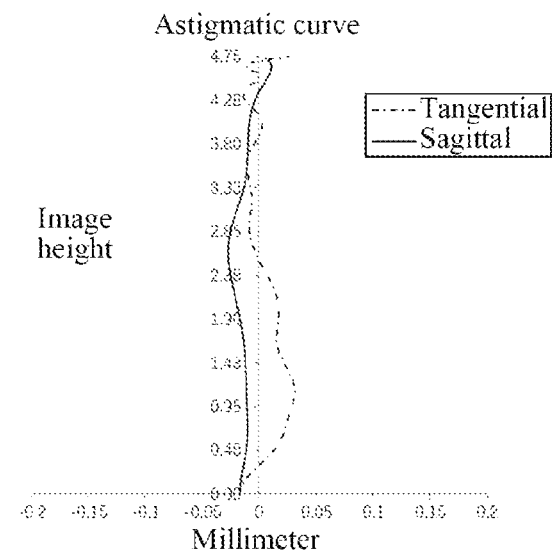
Figure 12C:
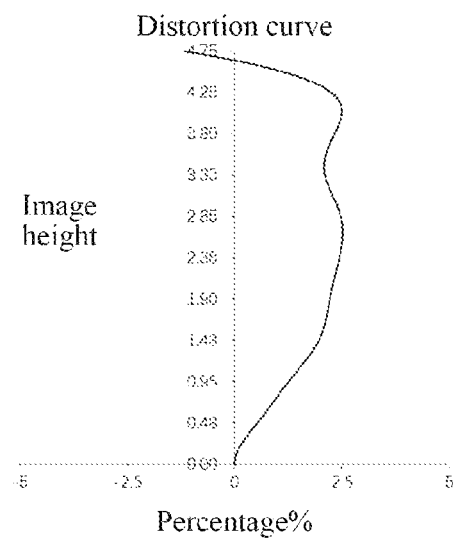
Figure 12D:
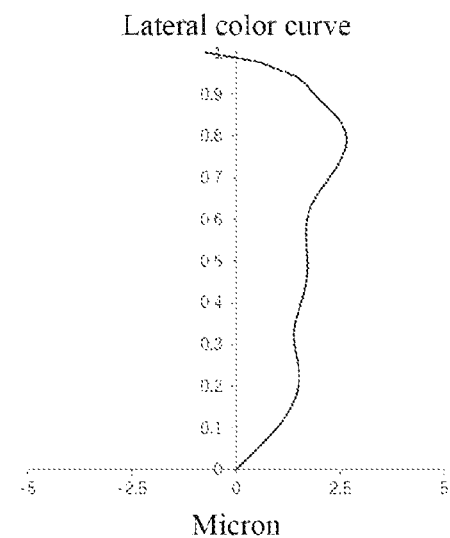

FIG. 12A illustrates the longitudinal aberration curve of the optical imaging lens assembly according to Embodiment 6, representing deviations of focal points converged by light of different wavelengths after passing through the lens assembly. FIG. 12B illustrates the astigmatic curve of the optical imaging lens assembly according to Embodiment 6, representing a curvature of a tangential plane and a curvature of a sagittal plane. FIG. 12C illustrates the distortion curve of the optical imaging lens assembly according to Embodiment 6, representing the amounts of distortion corresponding to different image heights. FIG. 12D illustrates the lateral color curve of the optical imaging lens assembly according to Embodiment 6, representing deviations of different image heights on an imaging plane after light passes through the lens assembly. It can be seen from FIG. 12A to FIG. 12D that the optical imaging lens assembly provided in Embodiment 6 can achieve good imaging quality.

In view of the above, the parameters of the optical imaging lens assembly in Embodiments 1 to 6 respectively satisfy the relationships shown in Table 13.

TABLE 13

| Conditional/Embodiment | 1 | 2 | 3 | 4 | 5 | 6 |
|---|---|---|---|---|---|---|
| TTL/ImgH | 1.36 | 1.46 | 1.42 | 1.45 | 1.44 | 1.43 |
| (R9 + R10)/f | 1.67 | 1.58 | 1.55 | 1.49 | 1.54 | 1.86 |
| R10/f | 0.80 | 0.74 | 0.73 | 0.70 | 0.77 | 0.96 |
| \|f4 × tan(FOV/2)\|/R9 | 4.36 | 5.47 | 3.67 | 3.51 | 4.47 | 4.44 |
| f12/f | 2.30 | 2.06 | 2.98 | 3.08 | 2.33 | 2.94 |
| (CT4 + CT5)/T45 | 2.13 | 2.11 | 2.21 | 2.28 | 2.46 | 4.32 |
| SAG62/SAG61 | 3.44 | 5.89 | 6.39 | 9.72 | 4.90 | 6.86 |
| CT6/ET6 | 3.24 | 3.89 | 3.70 | 3.24 | 3.55 | 3.06 |
| f2/f123 + f3/f123 | 3.04 | 3.28 | 3.21 | 3.27 | 3.10 | 4.12 |
| f2/f3 | 0.74 | 0.52 | 1.21 | 1.29 | 0.67 | 1.45 |
| (CT1 + CT2 + CT3 + CT4 + CT5)/(CT6 + CT7) | 1.49 | 1.33 | 1.28 | 1.19 | 1.32 | 1.11 |
| (R5 + R6)/f3 | −2.49 | −1.24 | −3.72 | −3.72 | −2.07 | −1.87 |
| ΣCT/ΣAT | 1.63 | 1.62 | 1.82 | 1.87 | 1.64 | 2.10 |

The present disclosure further provides an imaging apparatus, having an electronic photosensitive element, which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred Embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, along an optical axis from an object side to an image side, sequentially comprising:
    a first lens having refractive power;
    a second lens;
    a third lens, an object-side surface of the third lens being a concave surface, and an image-side surface of the third lens being a convex surface;
    a fourth lens having negative refractive power, an object-side surface of the fourth lens being a concave surface, and an image-side surface of the fourth lens being a concave surface;
    a fifth lens having refractive power;
    a sixth lens having positive refractive power; and
    a seventh lens having negative refractive power,
    the optical imaging lens assembly satisfying:

$TTL/ImgH \leq 1.5$; and $FOV > 100°$, wherein, TTL is a distance from an object-side surface of the first lens to an imaging plane of the optical imaging lens assembly on the optical axis, ImgH is half of a diagonal length of an effective pixel area on the imaging plane, and FOV is a maximum field-of-view of the optical imaging lens assembly.

2. The optical imaging lens assembly according to claim 1, wherein, the fifth lens has a convex object-side surface and a concave image-side surface.

3. The optical imaging lens assembly according to claim 1, wherein, $0.5 < R10/f < 1.0$,
    wherein, R10 is a radius of curvature of an image-side surface of the fifth lens, and f is an effective focal length of the optical imaging lens assembly.

4. The optical imaging lens assembly according to claim 1, wherein, $3.5 < |f4 \times \tan(FOV/2)|/R9 < 5.5$,
    wherein, f4 is an effective focal length of the fourth lens, FOV is the maximum field-of-view of the optical imaging lens assembly, and R9 is a radius of curvature of an object-side surface of the fifth lens.

5. The optical imaging lens assembly according to claim 1, wherein, $2.0 \leq f12/f \leq 3.2$,
    wherein, f12 is a combined focal length of the first lens and the second lens, and f is an effective focal length of the optical imaging lens assembly.

6. The optical imaging lens assembly according to claim 1, wherein, $2.0 \leq (CT4+CT5)/T45 \leq 4.5$,
    wherein, CT4 is a center thickness of the fourth lens along the optical axis, CT5 is a center thickness of the fifth lens along the optical axis, and T45 is a spacing distance between the fourth lens and the fifth lens along the optical axis.

7. The optical imaging lens assembly according to claim 1, wherein, 3.4≤SAG62/SAG61≤9.8, wherein, SAG61 is an axial distance from an intersection of an object-side surface of the sixth lens and the optical axis to a vertex of an effective radius of the object-side surface of the sixth lens, and SAG62 is an axial distance from an intersection of an image-side surface of the sixth lens and the optical axis to a vertex of an effective radius of the image-side surface of the sixth lens.

8. The optical imaging lens assembly according to claim 1, wherein, 3.0≤f2/f123+f3/f123≤4.5, wherein, f2 is an effective focal length of the second lens, f3 is an effective focal length of the third lens, and f123 is a combined focal length of the first lens, the second lens, and the third lens.

9. The optical imaging lens assembly according to claim 1, wherein, 0.5≤f2/f3≤1.5, wherein, f2 is an effective focal length of the second lens, and f3 is an effective focal length of the third lens.

10. The optical imaging lens assembly according to claim 1, wherein, 1.0≤(CT1+CT2+CT3+CT4+CT5)/(CT6+CT7)≤1.5, wherein, CT1 is a center thickness of the first lens along the optical axis, CT2 is a center thickness of the second lens along the optical axis, CT3 is a center thickness of the third lens along the optical axis, CT4 is a center thickness of the fourth lens along the optical axis, CT5 is a center thickness of the fifth lens along the optical axis, CT6 is a center thickness of the sixth lens along the optical axis, and CT7 is a center thickness of the seventh lens along the optical axis.

11. The optical imaging lens assembly according to claim 1, wherein, -4.0≤(R5+R6)/f3≤-1.0, wherein, R5 is a radius of curvature of the object-side surface of the third lens, R6 is a radius of curvature of the image-side surface of the third lens, and f3 is an effective focal length of the third lens.

12. The optical imaging lens assembly according to claim 1, wherein, 1.5≤ΣCT/ΣAT≤2.3, wherein, ΣAT is a sum of spacing distances of any two adjacent lenses from the first lens to the seventh lens along the optical axis, and ΣCT is a sum of center distances of the first lens to the seventh lens respectively along the optical axis.

13. An optical imaging lens assembly, along an optical axis from an object side to an image side, sequentially comprising:

a first lens having refractive power;
a second lens;
a third lens, an object-side surface of the third lens being a concave surface, and an image-side surface of the third lens being a convex surface;
a fourth lens;
a fifth lens having refractive power;
a sixth lens having positive refractive power; and
a seventh lens having negative refractive power, the optical imaging lens assembly satisfying:

$TTL/ImgH \leq 1.5$;

$FOV > 100°$; and $0 < (R9+R10)/f < 2.0$, wherein, TTL is a distance from an object-side surface of the first lens to an imaging plane of the optical imaging lens assembly on the optical axis, ImgH is half of a diagonal length of an effective pixel area on the imaging plane, FOV is a maximum field-of-view of the optical imaging lens assembly, R9 is a radius of curvature of an object-side surface of the fifth lens, R10 is a radius of curvature of an image-side surface of the fifth lens, and f is an effective focal length of the optical imaging lens assembly.

14. The optical imaging lens assembly according to claim 13, wherein, 0.5<R10/f<1.0, wherein, R10 is the radius of curvature of the image-side surface of the fifth lens, and f is the effective focal length of the optical imaging lens assembly.

15. The optical imaging lens assembly according to claim 13, wherein, 3.5<|f4×tan (FOV/2)|/R9<5.5, wherein, f4 is an effective focal length of the fourth lens, FOV is the maximum field-of-view of the optical imaging lens assembly, and R9 is the radius of curvature of the object-side surface of the fifth lens.

16. The optical imaging lens assembly according to claim 13, wherein, 2.0≤f12/f≤3.2, wherein, f12 is a combined focal length of the first lens and the second lens, and f is the effective focal length of the optical imaging lens assembly.

17. The optical imaging lens assembly according to claim 13, wherein, 2.0≤(CT4+CT5)/T45≤4.5, wherein, CT4 is a center thickness of the fourth lens along the optical axis, CT5 is a center thickness of the fifth lens along the optical axis, and T45 is a spacing distance between the fourth lens and the fifth lens along the optical axis.

18. The optical imaging lens assembly according to claim 13, wherein, 3.4≤SAG62/SAG61≤9.8, wherein, SAG61 is an axial distance from an intersection of an object-side surface of the sixth lens and the optical axis to a vertex of an effective radius of the object-side surface of the sixth lens, and SAG62 is an axial distance from an intersection of an image-side surface of the sixth lens and the optical axis to a vertex of an effective radius of the image-side surface of the sixth lens.

19. The optical imaging lens assembly according to claim 13, wherein, 3.0≤f2/f123+f3/f123≤4.5, wherein, f2 is an effective focal length of the second lens, f3 is an effective focal length of the third lens, and f123 is a combined focal length of the first lens, the second lens, and the third lens.

20. The optical imaging lens assembly according to claim 13, wherein, 0.5<f2/f3≤1.5, wherein, f2 is an effective focal length of the second lens, and f3 is an effective focal length of the third lens.

* * * * *